United States Patent
Nomura et al.

(10) Patent No.: US 12,487,397 B2
(45) Date of Patent: *Dec. 2, 2025

(54) OPTICAL FIBER

(71) Applicant: SUMITOMO ELECTRIC INDUSTRIES, LTD., Osaka (JP)

(72) Inventors: Takahiro Nomura, Osaka (JP); Kazuyuki Sohma, Osaka (JP); Keisei Morita, Osaka (JP); Takahiro Saito, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 360 days.

This patent is subject to a terminal disclaimer.

(21) Appl. No.: 17/897,314

(22) Filed: Aug. 29, 2022

(65) Prior Publication Data
US 2023/0080429 A1   Mar. 16, 2023

(30) Foreign Application Priority Data

Aug. 31, 2021  (JP) ................................. 2021-141603

(51) Int. Cl.
G02B 6/02 (2006.01)
C03C 25/105 (2018.01)
C03C 25/1065 (2018.01)

(52) U.S. Cl.
CPC ........ *G02B 6/02395* (2013.01); *C03C 25/105* (2013.01); *C03C 25/1065* (2013.01); *G02B 6/02214* (2013.01)

(58) Field of Classification Search
None
See application file for complete search history.

(56) References Cited

U.S. PATENT DOCUMENTS

2004/0200241 A1  10/2004  Otosaka et al.
2004/0227952 A1*  11/2004  Jasapara ............. C03B 37/0253
                                                         356/479

(Continued)

FOREIGN PATENT DOCUMENTS

CN   102844694 B  *  8/2016  ........... G02B 6/4482
CN   111032588 A      4/2020

(Continued)

OTHER PUBLICATIONS

U.S. Office Action issued Mar. 7, 2025 in U.S. Appl. No. 18/686,932.

(Continued)

*Primary Examiner* — Chris H Chu
(74) *Attorney, Agent, or Firm* — Faegre Drinker Biddle & Reath LLP

(57) ABSTRACT

An optical fiber includes a glass fiber and a coating resin layer surrounding the outer periphery of the glass fiber. The coating resin layer has a primary resin layer that surrounds the outer periphery of the glass fiber, and a secondary resin layer that surrounds the outer periphery of the primary resin layer. The primary resin layer has a thickness of 7.5 μm or more and 17.5 μm or less. The primary resin layer has a Young's modulus of 0.10 MPa or greater and 0.50 MPa or less at 23° C. The secondary resin layer has a thickness of 5.0 μm or more and 17.5 μm or less. The secondary resin layer has an outer diameter of 165 μm or more and 175 μm or less. The secondary resin layer has a Young's modulus of 1200 MPa or greater and 2800 MPa or less at 23° C.

17 Claims, 10 Drawing Sheets

(56) References Cited

U.S. PATENT DOCUMENTS

| | | |
|---|---|---|
| 2006/0039665 A1 | 2/2006 | Matsuo et al. |
| 2008/0107385 A1 | 5/2008 | Ohga et al. |
| 2012/0057834 A1 | 3/2012 | Oyamada et al. |
| 2012/0141077 A1 | 6/2012 | Nakanishi et al. |
| 2015/0274577 A1 | 10/2015 | Nakanishi et al. |
| 2016/0083293 A1 | 3/2016 | Okada |
| 2016/0209585 A1 | 7/2016 | Kishi et al. |
| 2018/0105462 A1 | 4/2018 | Shimada et al. |
| 2018/0128970 A1* | 5/2018 | Homma ............ C08G 18/4825 |
| 2020/0189958 A1 | 6/2020 | Kawaguchi et al. |
| 2020/0310056 A1 | 10/2020 | Boratav et al. |
| 2020/0333528 A1 | 10/2020 | Kawaguchi et al. |
| 2021/0041623 A1 | 2/2021 | Li et al. |
| 2021/0157049 A1 | 5/2021 | Hamakubo et al. |
| 2021/0223469 A1* | 7/2021 | Bickham ............... G02B 6/0281 |
| 2021/0364692 A1 | 11/2021 | Mukasa |
| 2024/0369758 A1 | 11/2024 | Morita |

FOREIGN PATENT DOCUMENTS

| | | | |
|---|---|---|---|
| EP | 2650709 B1 | 5/2019 | |
| JP | 2004-307280 A | 11/2004 | |
| JP | 2012-078804 A | 4/2012 | |
| JP | 2012-247464 A | 12/2012 | |
| JP | 2014066558 A * | 4/2014 | |
| JP | 2014-089458 A | 5/2014 | |
| JP | 2017-107079 A | 6/2017 | |
| JP | 2018-062448 A | 4/2018 | |
| JP | 2018-077303 A | 5/2018 | |
| JP | 2019-120894 A | 7/2019 | |
| JP | 2020-129037 A | 8/2020 | |
| JP | 2020-530586 A | 10/2020 | |
| WO | 2004/092794 A1 | 10/2004 | |
| WO | 2004/101456 A1 | 11/2004 | |
| WO | WO-2010/053356 A2 | 5/2010 | |
| WO | 2015/174182 A1 | 11/2015 | |
| WO | 2016/017743 A1 | 2/2016 | |
| WO | WO-2017/172714 A1 | 10/2017 | |
| WO | 2019/032408 A1 | 2/2019 | |
| WO | 2019/138848 A1 | 7/2019 | |
| WO | WO-2020045372 A1 * | 3/2020 | ......... G02B 6/02395 |
| WO | 2020/162209 A1 | 8/2020 | |

OTHER PUBLICATIONS

International Search Report issued in Patent Application No. PCT/JP2022/032650 dated Nov. 15, 2022.

Written Opinion issued in Patent Application No. PCT/JP2022/032650 dated Nov. 15, 2022.

U.S. Office Action issued Jul. 10, 2025, in U.S. Appl. No. 18/686,932.

* cited by examiner

OPTICAL FIBER

CROSS-REFERENCE TO RELATED APPLICATIONS

This application claims priority based on Japanese Patent Application No. 2021-141603 filed on Aug. 31, 2021, and the entire contents of which are incorporated herein by reference.

TECHNICAL FIELD

The present disclosure relates to an optical fiber.

BACKGROUND

International Publication WO 2010/053356 discloses an optical fiber. This optical fiber includes a glass fiber, a primary coating surrounding the glass fiber, and a secondary coating surrounding the primary coating layer. The glass fiber has a diameter of 125 μm and has a structure that satisfies the standard specifications of ITU-T G.657.A and/or the standard specifications of ITU-T G.657.B. The primary coating has an in situ elastic coefficient of more than 0.2 MPa and less than 0.65 MPa and a glass transition temperature of −50° C. or lower than that. The primary coating has an outer diameter of from 135 μm to 175 μm. When the optical fiber has an ink layer, the outer diameter of the optical fiber is 210 μm or less.

The specification of U.S. Unexamined Patent Publication No. 2021/0041623 discloses an optical fiber. On the outer surface of a cladding, a non-glass protective coating having an outer diameter of 210 μm or less is provided. The non-glass protective coating includes a primary coating that directly adjoins the outer surface of the cladding, and a secondary coating that directly adjoins the primary coating. The in situ elastic modulus of the primary coating is less than 1 MPa. The elastic modulus of the secondary coating is more than 1200 MPa.

International Publication WO 2017/172714 and Japanese Unexamined Patent Publication No. 2020-129037 are designated as other related documents.

SUMMARY

The optical fiber according to an aspect of the present disclosure includes: a glass fiber including a core and a cladding; and a coating resin layer surrounding an outer periphery of the glass fiber. The coating resin layer has a primary resin layer and a secondary resin layer. The primary resin layer surrounds an outer periphery of the glass fiber. The secondary resin layer surrounds an outer periphery of the primary resin layer. The glass fiber has an outer diameter of 124.5 μm or more and 125.5 μm or less. The primary resin layer has a thickness of 7.5 μm or more and 17.5 μm or less. The primary resin layer has a Young's modulus of 0.10 MPa or greater and 0.50 MPa or less at 23° C. The secondary resin layer has a thickness of 5.0 μm or more and 17.5 μm or less. The secondary resin layer has an outer diameter of 165 μm or more and 175 μm or less. The secondary resin layer has a Young's modulus of 1200 MPa or greater and 2800 MPa or less at 23° C.

An optical fiber according to another aspect of the present disclosure includes: a glass fiber including a core and a cladding; and a coating resin layer surrounding an outer periphery of the glass fiber. The coating resin layer has a primary resin layer, a secondary resin layer, and a first colored layer. The primary resin layer surrounds an outer periphery of the glass fiber. The secondary resin layer surrounds an outer periphery of the primary resin layer. The first colored layer surrounds an outer periphery of the secondary resin layer. The glass fiber has an outer diameter of 124.5 μm or more and 125.5 μm or less. The primary resin layer has a thickness of 7.5 μm or more and 17.5 μm or less. The primary resin layer has a Young's modulus of 0.10 MPa or greater and 0.60 MPa or less at 23° C. The secondary resin layer has a thickness of 5.0 μm or more and 17.5 μm or less. The secondary resin layer has an outer diameter of 165 μm or more and 175 μm or less. The secondary resin layer has a Young's modulus of 1200 MPa or greater and 2800 MPa or less at 23° C.

DETAILED DESCRIPTION

Figure 1:
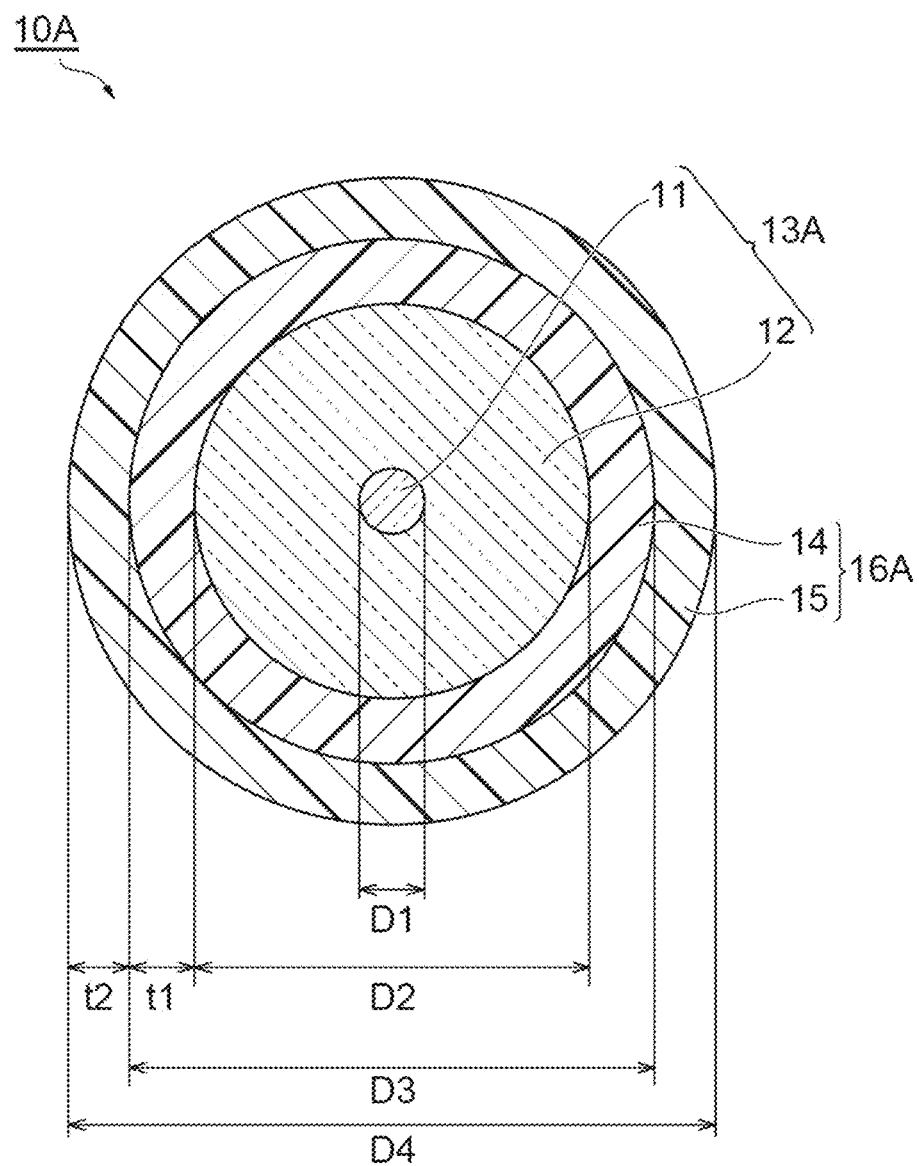
FIG. 1 is a diagram illustrating a cross-section perpendicular to the axial direction of an optical fiber according to a first embodiment.

Along with an increase in the capacity of optical communication in recent years, it is desirable to package a larger number of optical fibers in an optical cable. In order to do so, it is important that optical fibers that generally have an outer diameter of 250 μm are made to have smaller diameters. In that case, it is preferable to maintain general outer diameter of glass fibers (125 μm±0.5 μm) as it is without making the diameter thinner.

However, when the diameter of the optical fibers is made thinner while maintaining the outer diameter of the glass fiber, the coating resin layer becomes thinner. When the coating resin layer is thinner, the transmission loss (microbending loss) caused by minute bending occurring when a lateral pressure is applied to the optical fiber is likely to increase. That is, the lateral pressure resistance characteristics of the optical fiber are deteriorated. Deterioration of such lateral pressure characteristic can be suppressed to a certain extent by decreasing the Young's modulus of the primary resin layer; however, there is a problem that when the Young's modulus of the primary resin layer is made too small, deterioration in the low-temperature characteristics (when the optical fiber is left to stand at a low temperature of −60° C., the transmission loss increment of light having a wavelength of 1550 nm at room temperature is +0.1 dB/km or greater) occurs.

According to the present disclosure, an optical fiber in which the diameter can be made thinner while deterioration of low-temperature characteristics and lateral pressure resistance characteristics is suppressed, can be provided.

Firstly, the content of the embodiments of the present disclosure will be listed and explained. A first optical fiber according to an aspect of the present disclosure includes: a glass fiber including a core and a cladding; and a coating resin layer surrounding the outer periphery of the glass fiber. The coating resin layer has a primary resin layer and a secondary resin layer. The primary resin layer surrounds the outer periphery of the glass fiber. The secondary resin layer surrounds the outer periphery of the primary resin layer. The glass fiber has an outer diameter of 124.5 μm or more and 125.5 μm or less. The primary resin layer has a thickness of 7.5 μm or more and 17.5 μm or less. The primary resin layer has a Young's modulus of 0.10 MPa or greater and 0.50 MPa or less at 23° C. The secondary resin layer has a thickness of 5.0 μm or more and 17.5 μm or less. The secondary resin layer has an outer diameter of 165 μm or more and 175 μm or less. The secondary resin layer has a Young's modulus of 1200 MPa or greater and 2800 MPa or less at 23° C.

A second optical fiber according to an aspect of the present disclosure includes: a glass fiber including a core and a cladding; and a coating resin layer surrounding the outer periphery of the glass fiber. The coating resin layer has a primary resin layer, a secondary resin layer, and a first colored layer. The primary resin layer surrounds the outer periphery of the glass fiber. The secondary resin layer surrounds the outer periphery of the primary resin layer. The first colored layer surrounds the outer periphery of the secondary resin layer. The glass fiber has an outer diameter of 124.5 μm or more and 125.5 μm or less. The primary resin layer has a thickness of 7.5 μm or more and 17.5 μm or less. The primary resin layer has a Young's modulus of 0.10 MPa or greater and 0.60 MPa or less at 23° C. The secondary resin layer has a thickness of 5.0 μm or more and 17.5 μm or less. The secondary resin layer has an outer diameter of 165 μm or more and 175 μm or less. The secondary resin layer has a Young's modulus of 1200 MPa or greater and 2800 MPa or less at 23° C.

According to an experiment, by using an optical fiber having such parameters, it is possible to make the diameter smaller while suppressing deterioration of the low-temperature characteristics and the lateral pressure resistance characteristics.

With regard to the first optical fiber, the Young's modulus at 23° C. of the primary resin layer may be 0.10 MPa or greater and 0.30 MPa or less. Alternatively, with regard to the first optical fiber, the Young's modulus at 23° C. of the primary resin layer may be 0.30 MPa or greater and 0.50 MPa or less.

With regard to the second optical fiber, the Young's modulus at 23° C. of the primary resin layer may be 0.10 MPa or greater and 0.40 MPa or less. Alternatively, with regard to the second optical fiber, the Young's modulus at 23° C. of the primary resin layer may be 0.40 MPa or greater and 0.60 MPa or less.

The coating resin layer is formed between the secondary resin layer and the first colored layer and may further have a second colored layer having a color different from that of the first colored layer. The second colored layer may include a plurality of ring patterns formed to be arranged mutually at an interval in the axial direction of the glass fiber.

In a spectrum obtained by measuring, at a plurality of measurement points set at predetermined intervals in the axial direction of the glass fiber, an eccentric amount of the glass fiber from the central axis based on the outer periphery of the secondary resin layer, and Fourier transforming the waveform representing the eccentric amount at each position of the plurality of measurement points, the maximum value of the amplitude of the eccentric amount may be 6 μm or less.

When the first eccentric amount of the glass fiber from the central axis based on the outer periphery of the primary resin layer is measured at a plurality of measurement points set at predetermined intervals in the axial direction of the glass fiber, and the second eccentric amount of the glass fiber from the central axis based on the outer periphery of the secondary resin layer at the plurality of measurement points, the average value of the first eccentric amount may be smaller than the average value of the second eccentric amount.

The transmission loss difference determined by subtracting the transmission loss obtained at the time of rounding the above-described optical fiber into a ring having a diameter of 280 mm without winding the optical fiber around a bobbin, from the transmission loss obtained at the time of winding the optical fiber in one layer around a bobbin having a cylindrical diameter of 405 mm and having a metal mesh with a pitch of 150 μm wound thereon, may be 1.5 dB/km or less.

The cladding may include: an inner cladding that surrounds the outer periphery of the core; a trench that surrounds the outer periphery of the inner cladding; and an outer cladding that surrounds the outer periphery of the trench. The refractive index of the inner cladding may be lower than the refractive index of the core, the refractive index of the trench may be lower than the refractive index of the inner cladding, the refractive index of the outer cladding may be higher than the refractive index of the trench and lower than the refractive index of the core, and germanium may be added to the core. When the relative refractive index difference of the core with respect to the refractive index of the outer cladding is designated as $\Delta 1$, the relative refractive index difference of the inner cladding with respect to the refractive index of the outer cladding is designated as $\Delta 2$, the relative refractive index difference of the trench with respect to the refractive index of the outer cladding is designated as $\Delta 3$, the radius of the outer periphery of the core is designated as r1, the radius of the outer periphery of the inner cladding is designated as r2, and the radius of the outer periphery of the trench is designated as r3, r2/r1 may be 2.2 or more and 3.6 or less, r3−r2 may be 3 μm or more and 10 μm or less, $\Delta 1 - \Delta 2$ may be 0.15% or more and 0.40% or less, $|\Delta 2|$ may be 0.10% or less, and $\Delta 3$ may be −0.70% or more and −0.20% or less. The mode field diameter for light having a wavelength of 1310 nm may be 8.8 μm or more and 9.6 μm or less. The bending loss for light having a wavelength of 1625 nm when the optical fiber is wound into a torus shape having a diameter of 15 mm may be 1.0 dB or less per one turn, and the bending loss for light having a wavelength of 1625 nm when the optical fiber is wound into a torus shape having a diameter of 30 mm may be 0.1 dB or less per 10 turns. The zero-dispersion wavelength may be 1300 nm or more and 1324 nm or less, the cable cutoff wavelength may be 1260 nm or less, and the mean chlorine mass concentration of the inner cladding may be 500 ppm or more and 5000 ppm or less.

The mean OH mass concentration of the outer cladding may be 500 ppm or less.

When the standard error of the outer diameter variation in the axial (or length) direction of the glass fiber is designated as σ, 3σ may be 0.1 μm or more and 0.5 μm or less.

Specific examples of the optical fiber according to the present embodiment will be described, if necessary, with reference to the drawings. The present invention is not limited to these examples but is disclosed by the scope of the claims, and it is intended that all modifications within the meanings and scope equivalent to those of the claims are included. In the following description, identical elements will be assigned with identical reference numerals in the description of the drawings, and any overlapping description will not be repeated. In the following description, the "outer diameter" of any element refers to the outer diameter of the element in a direction perpendicular to the axis of the optical fiber. The "thickness" of any element refers to the thickness of the element in the radial direction (direction perpendicular to the axis) of the optical fiber.

First Embodiment

FIG. 1 is a diagram illustrating a cross-section perpendicular to the axial direction of an optical fiber 10A according to a first embodiment. The optical fiber 10A is a so-called optical fiber element wire and conforms to at least one of the specifications of ITU-T G.652 and the specifications of ITU-T G.657. Conforming to the specifications of ITU-T G.652 means conforming to at least one of G.652.A, G.652.B, G.652.C, and G.652.D. Conforming to the specifications of ITU-T G.657 means conforming to at least one of G.657.A and G.657.B. The optical fiber 10A includes: a glass fiber 13A including a core 11 and a cladding 12; and a coating resin layer 16A including a primary resin layer 14 provided on the outer periphery of the glass fiber 13A, and a secondary resin layer 15.

The cladding 12 surrounds the core 11. The core 11 and the cladding 12 mainly includes glass such as quartz glass, and for example, quartz glass with added germanium or pure quartz glass can be used for the core 11, while pure quartz glass or quartz glass with added fluorine can be used for the cladding 12. Here, the pure quartz glass substantially does not include impurities.

The outer diameter D2 of the glass fiber 13A, that is, the outer diameter of the cladding 12 is 125 μm±0.5 μm, that is, 124.5 μm or more and 125.5 μm or less, and the diameter D1 of the core 11 is 6.0 μm or more and 12.0 μm or less. Since the outer diameter D2 of the glass fiber 13A is the same as the outer diameter of general glass fibers as such, general optical fibers can be used for peripheral tools such as connectors and peripheral instruments such as a fusion machine, and replacement of existing optical fibers is easily achieved. For example, the optical fiber 10A can be easily applied to microduct cables, ultra-multicore cables for data center, and other various cables.

The thickness t2 of the secondary resin layer 15 is 5.0 μm or more and 17.5 μm or less. When the coating resin layer 16A is formed, since coating eccentricity (distance between the center of the glass fiber 13A and the center of the outer periphery of the coating resin layer 16A) with a magnitude of several micrometers (μm) occurs due to vibration of the glass fiber 13A, the secondary resin layer 15 may be locally thinned. When a foreign material adhered to the roller in a wire drawing step falls on a site that has been locally thinned as such, the foreign material causes wire breaking of the optical fiber 10A, and the yield of the optical fiber 10A is decreased. As the average thickness of the secondary resin layer is 5.0 μm or more, extreme thinning of the secondary resin layer 15 caused by coating eccentricity is prevented, and wire breaking of the optical fiber 10A can be reduced. The outer diameter D4 of the secondary resin layer 15 is 170 μm±5 μm, that is, 165 μm or more and 175 μm or less. When the outer diameter D4 of the secondary resin layer 15 has such a value, an optical fiber element wire having a small outer diameter compared with the outer diameter of conventional optical fiber element wires can be realized, and a larger number of optical fibers can be packaged in an optical cable.

The Young's modulus of the secondary resin layer 15 may be 1200 MPa or greater and 2800 MPa or less at 23° C., may be 1500 MPa or greater and 2800 MPa or less, and may be 2000 MPa or greater and 2700 MPa or less. When the Young's modulus of the secondary resin layer 15 is 1200 MPa or greater, the lateral pressure resistance characteristics are likely to be enhanced, and when the Young's modulus is 2800 MPa or less, since appropriate toughness can be imparted to the secondary resin layer 15, tension resistance and low-temperature characteristics are likely to be enhanced. When the Young's modulus of the secondary resin layer 15 is 2800 MPa or less, deterioration of the external appearance caused by external scratches and cracking of the secondary resin layer 15 are less likely to occur.

A secondary resin layer 15 having the above-described characteristics can be formed by curing a base resin containing an oligomer including urethane (meth)acrylate, a monomer, and a photopolymerization initiator, or a resin composition including this base resin and hydrophobic inorganic oxide particles. The term (meth)acrylate means an acrylate or a methacrylate corresponding thereto. The same also applies to (meth)acrylic acid and the like. The inorganic oxide particles are spherical particles. The inorganic oxide particles are at least one kind selected from the group consisting of silicon dioxide (silica), zirconium dioxide (zirconia), aluminum oxide (alumina), magnesium oxide (magnesia), titanium oxide (titania), tin oxide, and zinc oxide. From the viewpoint of imparting appropriate toughness to the secondary resin layer 15, the average primary particle size of the inorganic oxide particles may be 500 nm or less. From the viewpoint of increasing the Young's modulus of the secondary resin layer 15, the average primary particle size of the inorganic oxide particles may be 5 nm or more, or 10 nm or more.

The surface of the inorganic oxide particles is subjected to a hydrophobic treatment. The term hydrophobic treatment implies that a hydrophobic group has been introduced into the surface of the inorganic oxide particles. The hydrophobic group may be a reactive group (ultraviolet-curable functional group) such as a (meth)acryloyl group, or a non-reactive group such as an aliphatic hydrocarbon group (for example, an alkyl group) or an aromatic hydrocarbon group (for example, a phenyl group). When the inorganic oxide particles have a reactive group, it is easy to form a resin layer having a high Young's modulus. An ultraviolet-curable functional group may be introduced into the surface of the inorganic oxide particles. An ultraviolet-curable functional group can be introduced into the surface of the inorganic oxide particles by treating the inorganic oxide particles by means of a silane compound having an ultraviolet-curable functional group. Examples of the silane compound having an ultraviolet-curable functional group include a 3-methacryloxypropyltrimethoxysilane.

As the urethane (meth)acrylate, an oligomer obtained by reacting a polyol compound, a polyisocyanate compound, and a hydroxyl group-containing (meth)acrylate compound can be used. Examples of the polyol compound include polytetramethylene glycol. Examples of the polyisocyanate compound include 2,4-tolylene diisocyanate. Examples of the hydroxyl group-containing (meth)acrylate compound include 2-hydroxyethyl (meth)acrylate.

The base resin may further include epoxy (meth)acrylate as the oligomer. Regarding the epoxy (meth)acrylate, an oligomer obtained by reacting an epoxy resin having two or more glycidyl groups with a compound having a (meth) acryloyl group.

As the monomer, at least one selected from the group consisting of a monofunctional monomer having one polymerizable group, and a polyfunctional monomer having two or more polymerizable groups can be used. Regarding the monomer, two or more kinds thereof may be used as a mixture. Examples of the monofunctional monomer include methyl (meth)acrylate. Examples of the polyfunctional monomer include ethylene glycol di(meth)acrylate. From the viewpoint of increasing the Young's modulus of the resin layer, the monomer may include a polyfunctional monomer, or the monomer may include a monomer having two polymerizable groups.

Regarding the photopolymerization initiator, any one can be appropriately selected from radical photopolymerization initiators and used.

The thickness t1 of the primary resin layer 14 is 7.5 μm or more and 17.5 μm or less. In other words, the outer diameter D3 of the primary resin layer 14 is 140 μm or more and 160 μm or less. As the range of the Young's modulus of the primary resin layer that will be described below is satisfied, and at the same time, the outer diameter D3 of the primary resin layer 14 is 140 μm or more (that is, the thickness t1 of the primary resin layer 14 is 7.5 μm or more), sufficient lateral pressure resistance characteristics are secured, and an increase in the loss against the lateral pressure can be suppressed. As the outer diameter D3 of the primary resin layer 14 is 160 μm or less (that is, the thickness t1 of the primary resin layer 14 is 17.5 μm or less), a sufficient thickness t2 (5.0 μm or more) of the secondary resin layer 15 can be secured within the range of the outer diameter (165 μm or more and 175 μm or less) of the optical fiber 10A that has been determined in advance.

According to an aspect of the present embodiment, the Young's modulus of the primary resin layer 14 may be 0.10 MPa or greater and 0.30 MPa or less at 23° C. When the Young's modulus of the primary resin layer 14 is 0.10 MPa or greater, coating cracks called voids and peeling (delamination) of the coating are less likely to occur in the primary resin layer 14 at a screening tension of 1.5 kg or greater. This optical fiber 10A does not have a problem with low-temperature characteristics. When the Young's modulus of the primary resin layer 14 is 0.30 MPa or less, especially excellent lateral pressure resistance characteristics are obtained within the above-mentioned range of the thickness t1 of the primary resin layer 14. In the following description, an optical fiber 10A including a primary resin layer 14 having a Young's modulus of 0.10 MPa or greater and 0.30 MPa or less may be referred to as lateral pressure resistance-specialized type optical fiber.

According to another aspect of the present embodiment, the Young's modulus of the primary resin layer 14 may be 0.30 MPa or greater and 0.50 MPa or less at 23° C. When the Young's modulus of the primary resin layer 14 is 0.30 MPa or greater, coating cracks called voids and peeling (delamination) of the coating are less likely to occur in the primary resin layer 14 at a screening tension of 2.0 kg or greater, wire breaking is further less likely to occur during tape formation and cable formation, and productivity is enhanced. When the Young's modulus of the primary resin layer 14 is 0.50 MPa or less, lateral pressure resistance characteristics are obtained within the above-mentioned range of the thickness t1 of the primary resin layer 14. In the following description, an optical fiber 10A including a primary resin layer 14 having a Young's modulus of 0.30 MPa or greater and 0.50 MPa or less may be referred to as high screening tension type optical fiber.

A primary resin layer 14 having the above-described characteristics can be formed by, for example, curing a resin composition including an oligomer including urethane (meth)acrylate, a monomer, a photopolymerization initiator, and a silane coupling agent. The urethane (meth)acrylate, monomer, and photopolymerization initiator may be appropriately selected from the compounds listed as examples for the base resin. However, the resin composition that forms the primary resin layer 14 has a composition different from that of the base resin that forms the secondary resin layer 15.

First Example

Hereinafter, the results of an evaluation test performed using Examples and Comparative Examples according to the first embodiment will be described. Meanwhile, the present invention is not intended to be limited to these Examples.

A plurality of samples of the optical fiber 10A were produced by forming a primary resin layer 14 on the outer periphery of a glass fiber 13A having a diameter of 125 μm and having a core 11 and a cladding 12, and further forming a secondary resin layer 15 on the periphery of the primary resin layer 14. The following Table 1 and Table 2 are tables showing the outer diameter, thickness, and Young's modulus at 23° C. of the primary resin layer 14, the outer diameter, thickness, and Young's modulus at 23° C. of the secondary resin layer 15, the lateral pressure resistance characteristics, screening tension, and other characteristics.

TABLE 1

| | | Lateral pressure resistance-specialized type | | | | | High screening tension type | | | |
|---|---|---|---|---|---|---|---|---|---|---|
| Sample No. | | 1 | 2 | 3 | 4 | 5 | 6 | 7 | 8 | 9 |
| Outer diameter [μm] | Primary | 150 | 160 | 140 | 140 | 160 | 150 | 160 | 140 | 160 |
| | Secondary | 170 | 170 | 170 | 175 | 170 | 170 | 170 | 170 | 170 |
| Thickness [μm] | Primary | 12.5 | 17.5 | 7.5 | 7.5 | 17.5 | 12.5 | 17.5 | 7.5 | 17.5 |
| | Secondary | 10 | 5 | 15 | 17.5 | 5 | 10 | 5 | 15 | 5 |

TABLE 1-continued

|  |  | Lateral pressure resistance-specialized type | | | | | High screening tension type | | | |
|---|---|---|---|---|---|---|---|---|---|---|
| Sample No. |  | 1 | 2 | 3 | 4 | 5 | 6 | 7 | 8 | 9 |
| Young's modulus [MPa] | Primary | 0.20 | 0.10 | 0.10 | 0.10 | 0.30 | 0.40 | 0.50 | 0.40 | 0.30 |
|  | Secondary | 1200 | 1200 | 2800 | 2800 | 2800 | 1200 | 2800 | 2800 | 1200 |
| Lateral pressure resistance characteristics |  | A | A | A | A | A | B | B | B | B |
| Screening tension |  | B | B | B | B | B | A | A | A | A |
| Other characteristics |  | — | — | — | — | — | — | — | — | — |

TABLE 2

|  |  | Reference Example | | | | |
|---|---|---|---|---|---|---|
| Sample No. |  | 10 | 11 | 12 | 13 | 14 |
| Outer diameter [μm] | Primary | 150 | 165 | 135 | 150 | 150 |
|  | Secondary | 170 | 170 | 170 | 170 | 170 |
| Thickness [μm] | Primary | 12.5 | 20 | 5.0 | 12.5 | 12.5 |
|  | Secondary | 10 | 2.5 | 17.5 | 10 | 10 |
| Young's modulus [MPa] | Primary | 0.65 | 0.10 | 0.20 | 0.10 | 0.07 |
|  | Secondary | 1200 | 2800 | 1200 | 2900 | 1100 |
| Lateral pressure resistance characteristics |  | C | A | C | A | A |
| Screening tension |  | A | C | A | C | C |
| Other characteristics |  | — | Multiple occurrences of wire breaking | — | Secondary cracking and defective external appearance | Defective low-temperature characteristics |

In the present Example, a primary resin layer 14 having a Young's modulus of 0.10 MPa and a primary resin layer 14 having a Young's modulus of 0.20 MPa were obtained by means of a resin composition 1 shown in Table 3 (hereinafter, referred to as resin P1). A primary resin layer 14 having a Young's modulus of 0.30 MPa and a primary resin layer 14 having a Young's modulus of 0.40 MPa were obtained by means of a resin composition 2 shown in Table 3 (hereinafter, referred to as resin P2). A primary resin layer 14 having a Young's modulus of 0.50 MPa was obtained by means of a resin composition 3 shown in Table 3 (hereinafter, referred to as resin P3). A primary resin layer 14 having a Young's modulus of 0.07 MPa was obtained by means of a resin composition 4 shown in Table 3. A primary resin layer 14 having a Young's modulus of 0.65 MPa was obtained by means of a resin composition 5 shown in Table 3. Urethane oligomer (I) is specifically HEA-TDI-(PPG3000-TDI)$_{2,1}$-HEA, urethane oligomer (II) is specifically HEA-TDI-(PPG3000-TDI)$_{2,1}$-EH, and urethane oligomer (III) is specifically HEA-TDI-(PPG3000-TDI)$_{2,1}$-SiI.

TABLE 3

| Resin composition No. | | | 1 | 2 | 3 | 4 | 5 |
|---|---|---|---|---|---|---|---|
| Composition (% by mass) | Urethane oligomer | (I) | 2.0 | 3.0 | 5.0 | 1.0 | 7.0 |
|  |  | (II) | 75 | 70 | 68 | 78 | 66 |
|  |  | (III) | 7.0 | 7.0 | 7.0 | 7.0 | 7.0 |
|  | Radical polymerizable non-urethane monomer | 2-Ethylhexyl acrylate | 10 | 10 | 10 | 10 | 10 |
|  |  | N-vinylcaprolactam | 8.5 | 8.5 | 8.5 | 8.5 | 8.5 |
|  |  | Trimethylpropane triacrylate | 0.50 | 0.50 | 0.50 | 0.50 | 0.50 |
|  |  | Trimethoxysilylpropyl methacrylate | 0.15 | 0.15 | 0.15 | 0.15 | 0.15 |
|  | Non-radical polymerizable alkoxysilane | Tetraethoxysilane | 0.50 | 0.50 | 0.50 | 0.50 | 0.50 |
|  | Photopolymerization initiator | 2,4,6-Trimethylbenzoyl-diphenylphosphine oxide | 1.2 | 1.2 | 1.2 | 1.2 | 1.2 |
|  | Additive | Hindered phenol-based oxidation inhibitor | 0.60 | 0.60 | 0.60 | 0.60 | 0.60 |

In the present Example, among the respective secondary resin layers 15 of the samples, with regard to those having a Young's modulus of 1100 MPa and those having a Young's modulus of 1200 MPa (hereinafter, referred to as resin S1), differences of the Young's moduli were obtained by UV power adjustment or selection based on the fluctuation of each sample, on the basis of the following Table 4. UA1 was produced by reacting 2,4-tolylene diisocyanate with polypropylene glycol (number average molecular weight 2000) at a weight ratio of 1:5.7. UA2 was produced by reacting 2,4-tolylene diisocyanate with polypropylene glycol (number average molecular weight 10000) at a weight ratio of 1:28.

TABLE 4

| Component | Parts by mass (%) |
|---|---|
| UA1 | 20.0 |
| UA2 | 1.0 |
| Bisphenol A epoxy diacrylate | 48.0 |
| Tripropylene glycol diacrylate | 32.0 |
| 1-Hydroxycyclohexyl phenyl ketone | 2.0 |
| 2,4,6-Trimethylbenzoyldiphenylphosphine oxide | 0.4 |

In the present Example, among the respective secondary resin layers 15 of the samples, with regard to those having a Young's modulus of 2800 MPa and those having a Young's modulus of 2900 MPa (hereinafter, referred to as resin S2), the composition shown in the following Table 5 was adopted, and differences of the Young's moduli were obtained by UV power adjustment or selection based on the fluctuation of each sample. UA is a urethane acrylate obtained by reacting a polypropylene glycol having a molecular weight of 600, 2,4-tolylene diisocyanate, and hydroxyethyl acrylate. EA is epoxy diacrylate.

TABLE 5

| Oligomer | UA | 50 |
|---|---|---|
| (% by mass) | EA | 10 |
| Monomer | Isobornyl acrylate | 10 |
| (% by mass) | Tripropylene glycol diacrylate | 13 |
|  | 2-Phenoxyethyl acrylate | 17 |
| Silica particles (% by mass) |  | 65 |

In the present Example, the Young's modulus of the primary resin layer 14 was measured by a Pullout Modulus (POM) method at 23° C. A metal cylinder is adhered at each of two sites (separated at a predetermined interval) of an optical fiber 10A. The coating resin layer (primary resin layer 14 and secondary resin layer 15) portion between the cylinders is removed to expose glass. The optical fiber on the outer side of a metal cylinder (side away from the other metal cylinder) is cut away (the length of the optical fiber is the sum of the lengths of the portion adhered to both the metal cylinders and the portion between the metal cylinders). Next, one of the metal cylinders was fixed, and the other metal cylinder was gently and slightly moved in the direction opposite to the above-mentioned fixed metal cylinder. When the length of the metal cylinder (length over which the optical fiber 10A was adhered) was designated as L, the travel amount of the chucks was designated as Z, the outer diameter of the primary resin layer 14 was designated as Dp, the outer diameter of the glass fiber 13A was designated as Df, the Poisson ratio of the primary resin layer 14 was designated as n, and the load at the time of moving the chuck device was designated as W, the Youngs modulus of the primary resin layer 14 was determined from the following formula:

$$\text{Young's modulus (MPa)} = ((1+n)W/\pi LZ) \times \ln(Dp/Df)$$

At this time, the primary resin layer 14 was deformed, while the glass fiber 13, the secondary resin layer 15, and the adhesion parts were not deformed (not elongated), so it is considered that the metal cylinders moved.

Regarding the Young's modulus of the secondary resin layer 15, a tensile test (gauge length: 25 mm) was performed in an environment at 23° C.±2° C. and 50%±10% RH using a pipe-shaped coating resin layer (length: 50 mm or more) obtained by pulling out the glass fiber 13A from the optical fiber 10A, and the Young's modulus was determined from the 2.5% secant value.

The lateral pressure resistance characteristics were evaluated by the following method. 500 in of an optical fiber 10A was wound in only one layer with a tension of 80 g around a bobbin having a cylindrical diameter of 405 mm, on which a flatly wound plain-woven metal mesh having a wire outer diameter of 50 μm and a pitch of 150 μm was wound, and the transmission loss of the optical fiber is measured in that state. That optical fiber 10A is wound around a bobbin having a cylindrical diameter of 280 mm and then is taken out from the bobbin, and the optical fiber 10A is arranged in a state of being wound in a ring shape having a diameter of about 280 mm. In that state, the transmission loss of the optical fiber is measured (measurement is made three times for each case, and the average value is determined). The difference between the average values is designated as the transmission loss difference. Here, the transmission loss is the transmission loss of light having a wavelength of 1550 nm and was calculated from a loss spectrum measured by a cutback method. A case in which the transmission loss difference was 1.0 dB/km or less was rated as lateral pressure resistance characteristic "A"; a case in which the transmission loss difference was more than 1.0 dB/km and 1.5 dB/km or less was rated as lateral pressure resistance characteristic "B"; and a case in which the transmission loss difference was more than 1.5 dB/km was rated as lateral pressure resistance characteristic "C".

The screening tension was evaluated by the following method. An optical fiber having a length of 1000 kin is rewound with a tension applied thereon. A case in which the number of times of wire breaking at the time of rewinding the optical fiber having a length of 1000 kin with a tension of 2.0 kg (more specifically, 1.9 kg or more and 2.3 kg or less) was 5 or fewer times was evaluated as screening tension "A". A case in which in a tensile test with a tension of 2.0 kg, more than 5 times of wire breaking occurred at the time of rewinding the optical fiber having a length of 1000 kin, whereas in a tensile test with a tension of 1.5 kg (more specifically, 1.4 kg or more and 1.6 kg or less), the number of times of wire breaking at the time of rewinding the optical fiber having a length of 1000 kin was 5 or fewer times, was rated as screening tension "B". A case in which in a tensile test with a tension of 1.5 kg, the number of times of wire breaking at the time of rewinding the optical fiber having a length of 1000 kin was more than 5 times, was rated as screening tension "C". There is a correlation between the tension resistance and the low-temperature characteristics of an optical fiber. That is, for an optical fiber that can withstand a screening tension of 2.0 kg, the transmission loss difference between 23° C. and −60° C. is 0.1 dB/km or less, and for an optical fiber that can withstand a screening tension of 1.5 kg, the transmission loss difference between 23° C. and −60° C. is 1.2 dB/km or less. The transmission loss difference between 23° C. and −60° C. can be determined by loosely winding an optical fiber having a length of 1 kin into a ring having a diameter of 280 mm, measuring the transmission loss of signal light having a wavelength of 1550 nm by an OTDR method under each temperature condition, and then subtracting the transmission loss at 23° C. from the transmission loss at −60° C.

According to this Example, when the thickness of the primary resin layer 14 is 7.5 μm or more and 17.5 μm or less, the thickness of the secondary resin layer 15 is 5.0 μm or more and 17.5 μm or less, the Young's modulus of the primary resin layer is 0.10 MPa or greater and 0.50 MPa or less, and the Young's modulus at 23° C. of the secondary resin layer is 1200 MPa or greater and 2800 MPa or less, the rating for the lateral pressure resistance characteristics is A or B, while the rating for the screening tension is A or B, and an optical fiber 10A having a smaller diameter, in which deterioration of the lateral pressure resistance characteristics and tension resistance (low-temperature characteristics) is suppressed, can be provided. Particularly, when the Young's modulus of the primary resin layer is 0.10 MPa or greater and 0.30 MPa or less, a lateral pressure resistance-specialized type optical fiber 10A whose rating for the lateral pressure resistance characteristics is A, can be provided. When the Young's modulus of the primary resin layer is 0.30 MPa or greater and 0.50 MPa or less, a high screening tension type (low-temperature characteristics-specialized type) optical fiber 10A whose rating for the screening tension is A, can be provided. As the screening tension is higher, the optical fiber 10A is less likely to break in a tape-forming step, which is a subsequent step, and the product yield for a multicore cable is enhanced.

As shown in Table 2, when the thickness of the secondary resin layer is set to be less than 5.0 μm, wire breaking of the optical fiber 10A occurs multiple times, and it was inappropriate for the production of a product. When the Young's modulus of the secondary resin layer 15 was greater than 2800 MPa, the coating became brittle, cracking occurred in the secondary resin layer 15, and the optical fiber 10A had defective external appearance.

Second Embodiment

In a step of producing an optical fiber 10A having a small outer diameter D4, the frequency of the optical fiber undergoing wire breaking is likely to be higher as compared with an optical fiber having a conventional outer diameter (for example, 250 μm). When wire breaking of the optical fiber 10A occurs in the production process, there is a risk that the production efficiency for the optical fiber 10A may be decreased. For such a problem, the inventors found that the frequency of wire breaking of the optical fiber 10A in the production process is dependent on the eccentric amount of the glass fiber 13A in the optical fiber 10A.

When passing through a die inside a resin coating device, the glass fiber 13A vibrates in the diameter direction of the glass fiber 13A, the glass fiber 13A is eccentric with respect to the opening of the die, and the coating resin layer 16A is formed in that state. For this reason, the coating resin layer 16A is thinned in a direction in which the central axis of the glass fiber 13A is deviated from the central axis of the optical fiber 10A. In this case, when the optical fiber 10A comes into contact with burrs of a guide roller or foreign materials on a guide roller, there is a risk that large stress may be locally applied to the glass fiber 13A through the portion where the coating resin layer 16A is thinner. For this reason, damage such as cracks may occur in the glass fiber 13A. As a result, there is a risk that the optical fiber 10A may break such that wire breaking begins from a site of damage in the glass fiber 13A as a starting point. In optical fibers having smaller outer diameters, wire breaking may occur even when eccentricity occurs to the extent that does not induce wire breaking in conventional optical fibers.

Thus, the inventors of the present invention conducted, as an investigation on the eccentric amount of the above-mentioned glass fiber 13A, Fourier transformation of the waveform representing the eccentric amount of the glass fiber 13A with respect to the position in the axial direction of the glass fiber 13A, and analyzed a spectrum obtained by the Fourier transformation.

As a result, the present inventors succeeded in suppressing wire breaking of the optical fiber 10A by adjusting the production conditions and the production apparatus so as to suppress the maximum amplitude to a predetermined value or less in the spectrum obtained by Fourier transforming the eccentric amount waveform of the glass fiber 13A. The present embodiment is based on the above-described findings discovered by the present inventors.

Figure 2:
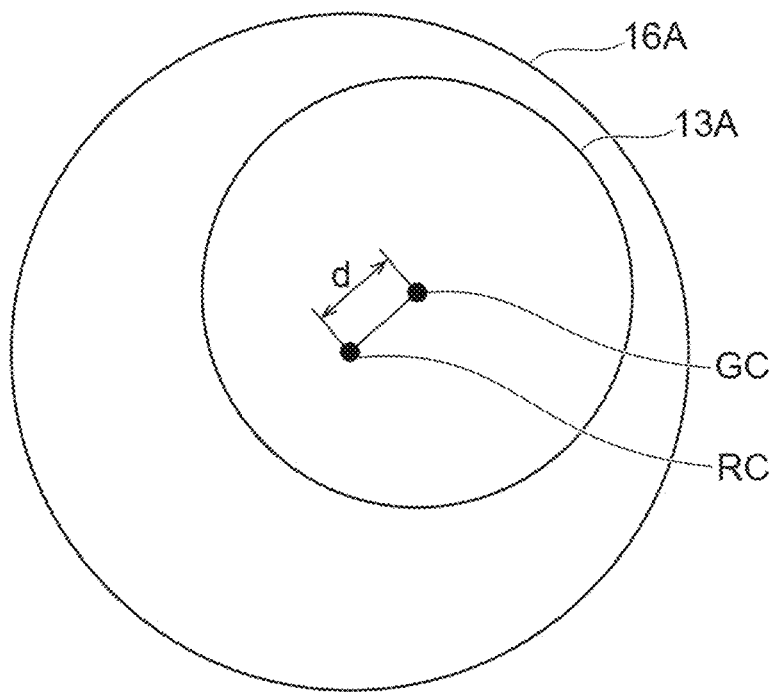
FIG. 2 is a schematic cross-sectional view for explaining the definition of an eccentric amount of a glass fiber.
Figure 3:
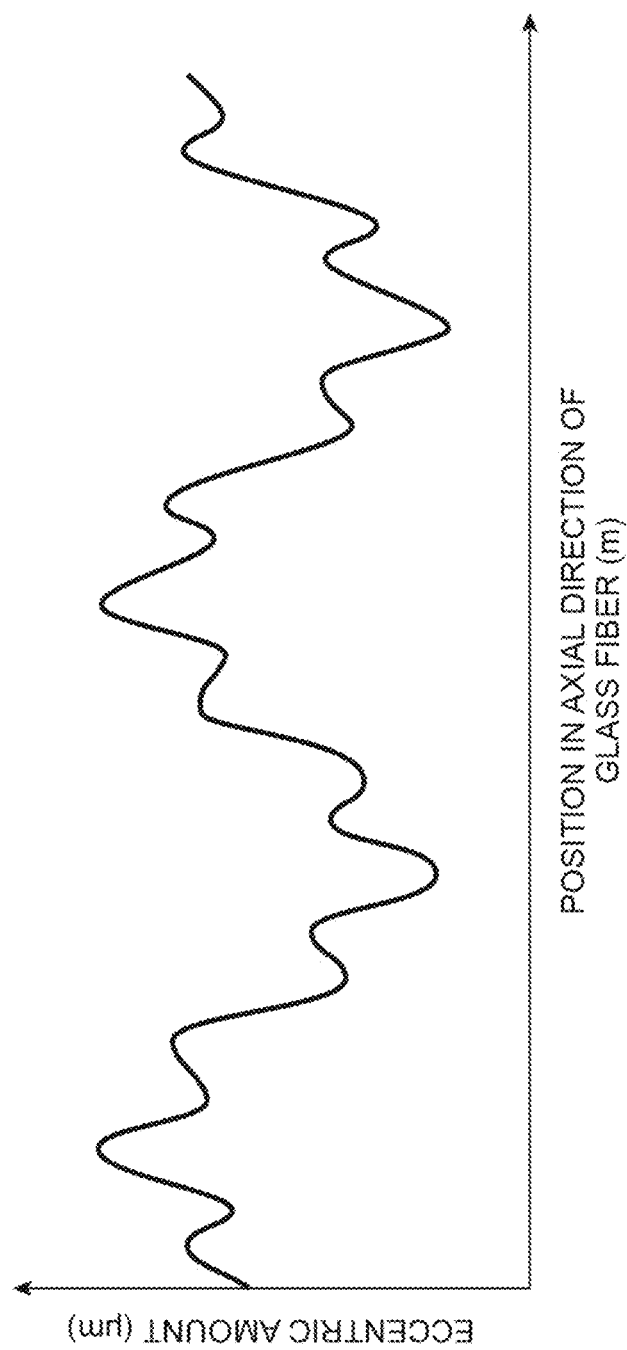
FIG. 3 is a diagram of an eccentric amount waveform showing the eccentric amount of a glass fiber with respect to the position in the axial direction of the glass fiber.
Figure 4:
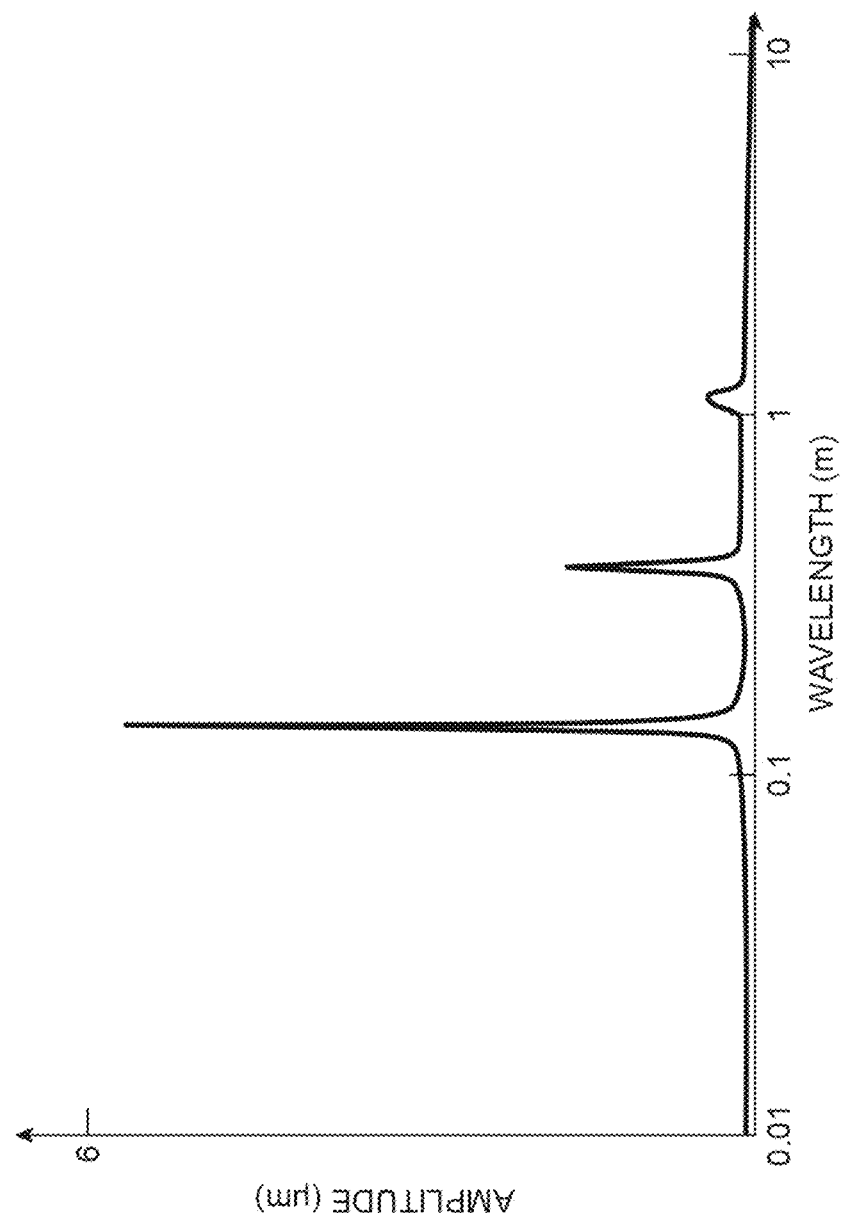
FIG. 4 is a diagram showing an example of a spectrum obtained by Fourier transforming the eccentric amount waveform.

The eccentric amount of the glass fiber 13A according to the present embodiment will be described with reference to FIG. 2, FIG. 3, and FIG. 4. FIG. 2 is a schematic cross-sectional view for explaining the definition of the eccentric amount of the glass fiber 13A. FIG. 3 is a diagram of the eccentric amount waveform showing the eccentric amount of the glass fiber 13A with respect to the position in the axial direction of the glass fiber 13A. FIG. 4 is a diagram showing an example of the spectrum obtained by Fourier transforming the eccentric amount waveform.

First, the definition of the eccentric amount of the glass fiber 13A will be described with reference to FIG. 2. FIG. 2 is an explanatory diagram for illustrative purpose only and is not intended to show the state of the optical fiber 10A of the present embodiment. However, in order to simplify the description, the same reference numerals as those in FIG. 1 are used.

As shown in FIG. 2, the eccentric amount d of the glass fiber 13A is defined as the distance from the central axis RC based on the outer periphery of the coating resin layer 16A to the central axis GC of the glass fiber 13A (amount of deviation in the diameter direction, or the amount of displacement in the diameter direction). Here, the eccentric amount of the glass fiber 13A is measured by means of, for example, an eccentric amount variation observation apparatus.

The eccentric amount variation observation apparatus is configured as an image recognition apparatus for eccentricity and has, for example, a first light source, a first image pickup unit, a second light source, and a second image pickup unit. The first light source is disposed so as to irradiate light in the short direction of the optical fiber 10A of the object of measurement. The light of the first light source includes a wavelength that penetrates through the coating resin layer 16A. The first image pickup unit is disposed to face the first light source, with the optical fiber 10A as the object of measurement interposed therebetween, and is configured so as to acquire an image of light that has penetrated through the optical fiber 10A. The second light source and the second image pickup unit are configured similarly to the first light source and the first image pickup unit, except that the second light source and the second image pickup unit are disposed to orthogonally intersect the direction opposite to the first light source and the first image pickup unit.

Based on such a configuration, in the directions of two axes that are perpendicular to the central axis of the optical fiber 10A and orthogonally intersect each other, the position of the outer periphery of the coating resin layer 16A and the position of the inner periphery of the coating resin layer 16A (position of the outer periphery of the glass fiber 13A) can be determined based on the light that has penetrated through the optical fiber 10A, and the eccentric amount of the glass fiber 13A, which is the distance between those centers, can be measured. That is, the eccentric amount of the glass fiber 13A can be measured while the optical fiber 10A is made non-destructive.

The eccentric amount of the glass fiber 13A is measured at a plurality of measurement points set at predetermined intervals in the axial direction of the glass fiber 13A. Then, the waveform (distribution) of the eccentric amount can be obtained by plotting the measurement results, with the positions of the plurality of measurement points represented on the axis of abscissa and the eccentric amount at each of the positions represented on the axis of ordinate. In the following description, the waveform of the eccentric amount of the glass fiber 13A is also referred to as "eccentric amount waveform".

Through the above-mentioned measurement, for example, the eccentric amount waveform shown in FIG. 3 is obtained. The "eccentric amount" on the axis of ordinate of FIG. 3 is the absolute value of the eccentric amount that does not depend on direction. As shown in FIG. 3, the eccentric amount waveform for an actual optical fiber 10A has a complicated shape. Thus, as shown in FIG. 4, the present inventors subjected the eccentric amount waveform of the optical fiber 10A to Fourier transformation and analyzed a spectrum obtained by the Fourier transformation.

As a result, the present inventors succeeded in decreasing the frequency of wire breaking by suppressing the "maximum value of the amplitude of the eccentric amount" in the spectrum obtained by Fourier transforming the eccentric amount waveform. The component that makes the amplitude of the eccentric amount maximal is also referred to as "maximum amplitude component".

Based on the above-mentioned findings, the optical fiber 10A of the present embodiment satisfies at least any one of the following requirements in relation to the eccentric amount of the glass fiber 13A.

As shown in FIG. 4, according to the present embodiment, in the spectrum obtained by Fourier transforming the eccentric amount waveform of the glass fiber 13A, the maximum value of the amplitude of the eccentric amount (amplitude value of the maximum amplitude component) is 6 μm or less. When the maximum value of the amplitude of the eccentric amount is more than 6 μm, the glass fiber 13A is significantly eccentric locally at a position where the peaks of the eccentric amount for each of the frequency components of the eccentric amount having different periods overlap each other. For this reason, the coating resin layer 16A is likely to be locally thinned. As a result, there is a risk that the frequency of wire breaking of the glass fiber 13A may increase. In contrast, in the present embodiment, the maximum value of the amplitude of the eccentric amount is set to 6 μm or less. In this case, even when the peaks of the eccentric amount for each of the frequency components of the eccentric amount having different periods overlap each other, locally large eccentricity of the glass fiber 13A can be suppressed. As a result, the coating resin layer 16A can be suppressed from locally thinning Consequently, the frequency of wire breaking of the glass fiber 13A can be reduced. The maximum value of the amplitude of the eccentric amount is not particularly limited, and the maximum value may be closer to 0 μm as far as possible.

As shown in FIG. 4, in the present embodiment, the wavelength at which the amplitude of the eccentric amount is the maximum (wavelength of the maximum amplitude component) in a spectrum obtained by Fourier transforming the eccentric amount waveform of the glass fiber 13A is 0.1 m or more. When the wavelength at which the amplitude of the eccentric amount is the maximum is less than 0.1 m, overlapping of a component that causes the amplitude of the eccentric amount to be the maximum and another component having a different wavelength frequently occurs. For this reason, the coating resin layer 16A is often locally thin. That is, the number of sites at which the thickness of the coating resin layer 16A per unit length in the axial direction of the glass fiber 13A is thin is increased. As a result, there is concern that the frequency of wire breaking of the glass fiber 13A may increase. In contrast, in the present embodiment, the "other component having a different wavelength" that overlaps the component having the maximum amplitude of the eccentric amount can be reduced by setting the wavelength at which the amplitude of the eccentric amount is the maximum, to 0.1 m or more. As a result, the coating resin layer 16A can be suppressed from becoming locally thin. That is, an increase in the number of sites having a small thickness of the coating resin layer 16A per unit length in the axial direction of the glass fiber 13A can be suppressed. As a result, the frequency of wire breaking of the glass fiber 13A can be reduced.

The upper limit value of the wavelength at which the amplitude of the eccentric amount is the maximum is not particularly limited, and the upper limit value may be as large as possible. However, when the linear velocity and the like of the optical fiber production apparatus 50 that will be described below are taken into consideration, the wavelength at which the amplitude of the eccentric amount is the maximum is, for example, 1 m or less.

Figure 5:
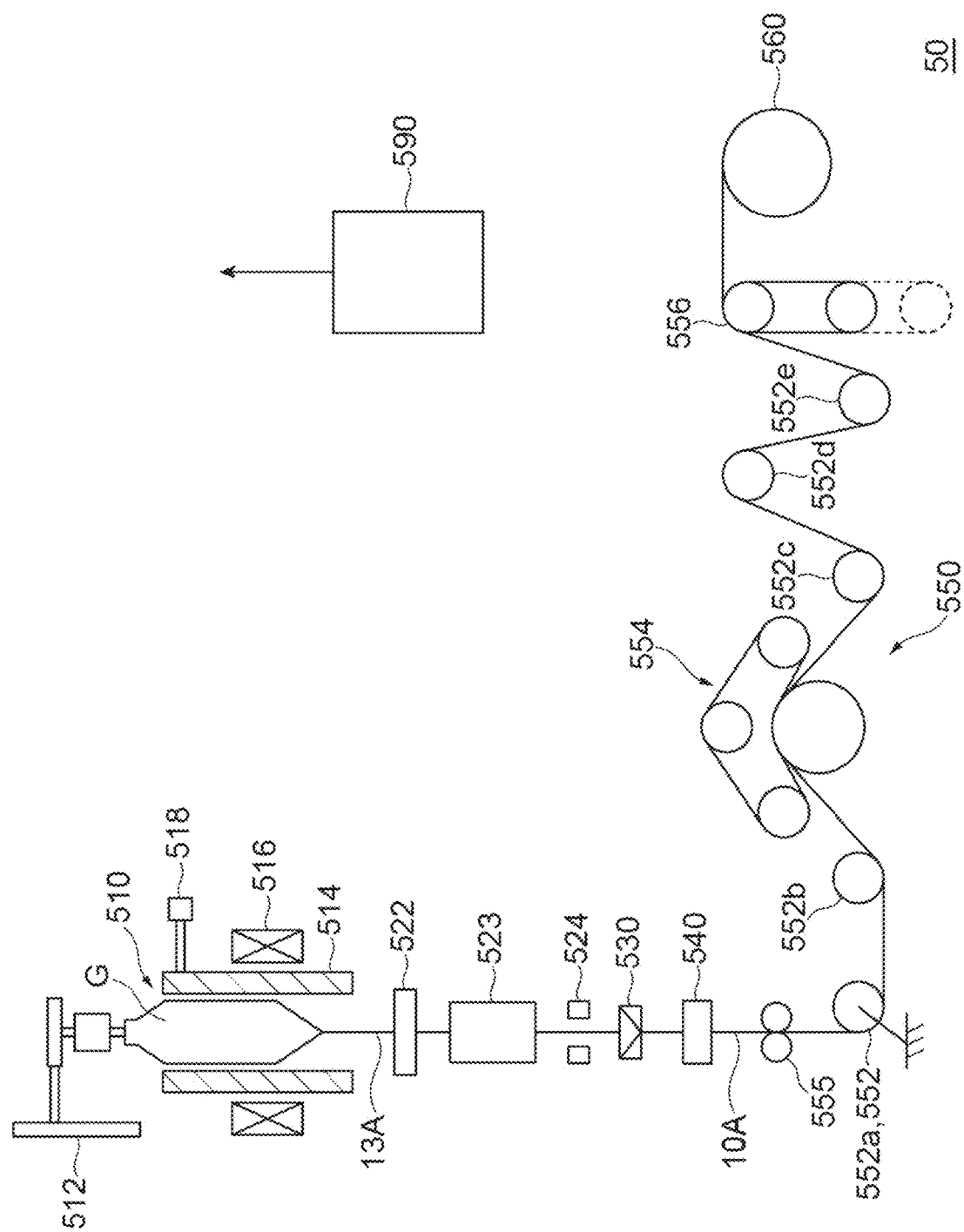
FIG. 5 is a schematic configurational diagram illustrating an apparatus for manufacturing optical fibers according to the present embodiment.

FIG. 5 is a schematic configuration diagram illustrating an optical fiber production apparatus 50 according to the present embodiment. The optical fiber production apparatus 50 according to the present embodiment will be described with reference to FIG. 5. The optical fiber production apparatus 50 includes, for example, a wire drawing furnace 510; a fiber position measuring unit 522; a cooling device 523; an outer diameter measuring unit 524; a resin coating device 530; a curing device 540; a conveyance unit 550; a bobbin 560; and a control unit 590. The apparatus members other than the control unit 590 are provided in this order. The wire drawing furnace 510 has a gripping mechanism 512; a furnace core tube 514; a heat generator 516; and a gas supply unit 518. Hereinafter, for each apparatus members of the optical fiber production apparatus 50, the side closer to the gripping mechanism 512 will be referred to as "upstream", and the side closer to the bobbin 560 will be referred to as "downstream".

The wire drawing furnace 510 is configured to form the glass fiber 13A. A glass parent material G is heated in the wire drawing furnace 510, and the softened glass is extended to form a glass fiber 13A having a small diameter. The fiber position measuring unit 522 is configured to measure the position in the horizontal direction of the glass fiber 13A. The cooling device 523 is configured to cool the glass fiber 13A formed in the wire drawing furnace 510. The outer diameter measuring unit 524 is configured to measure the outer peripheral diameter of the glass fiber 13A before resin coating.

The resin coating device 530 is configured to form the coating resin layer 16A so as to surround the outer periphery of the glass fiber 13A. The resin coating device 530 has a die that applies an ultraviolet-curable resin composition on the outer periphery of the glass fiber 13A while inserting the glass fiber 13A therethrough. In the present embodiment, the resin coating device 530 has two dies that form a primary resin layer 14 and a secondary resin layer 15 from the central axis side of the glass fiber 13A toward the outer periphery side in this order. The curing device 540 is configured to irradiate ultraviolet radiation to the coating resin layer 16A and cure the coating resin layer 16A.

The conveyance unit 550 is configured to convey the optical fiber 10A obtained by curing the coating resin layer 16A. Specifically, the conveyance unit 550 has, for example, a plurality of guide rollers 552 and 556; and a capstan 554. A direct-under roller 552a, which is one of the multiple guide rollers 552, is located, for example, immediately below the curing device 540. The capstan 554 is provided on the downstream side of the direct-under roller 552a and is configured, for example, to convey (tow) the optical fiber 10A with a predetermined tension while gripping the optical fiber 10A between a belt and the rollers. A guide roller 552b among the plurality of guide rollers 552 is provided between the direct-under roller 552a and the capstan 554. Screening rollers 552c, 552d, and 552e among the plurality of guide rollers 552 are provided on the downstream side of the capstan 554 and are configured to apply screening tension to the optical fiber 10A together with the capstan 554. A guide roller 556 is provided on the downstream side of the screening roller 552e and is configured to adjust the tension of the optical fiber 10A by moving up and down according to the variation of the tension of the optical fiber 10A.

The bobbin 560 is provided, for example, on the downstream side of the guide roller 556 and is configured to wind the optical fiber 10A. The control unit 590 is configured to be, for example, connected to each of the units of the optical fiber production apparatus 50 and control these units. The control unit 590 is configured as, for example, a computer.

Here, in the present embodiment, in order to produce an optical fiber 10A that satisfies the above-mentioned requirement of the eccentric amount of the glass fiber 13A, the optical fiber production apparatus 50 is configured, for example, as follows.

In the present embodiment, among all the rollers including the direct-under roller 552a and a plurality of guide rollers 552 downstream of the direct-under roller 552a, the circumferential length of the largest roller is, for example, 0.2 m or more. The circumferential length of the largest guide roller 552 may be, for example, 0.9 m or less.

In the present embodiment, as shown in FIG. 5, the conveyance unit 550 has, for example, a vibration suppression unit 555. The vibration suppression unit 555 is provided, for example, downstream of the curing device 540 and upstream of the direct-under roller 552a located immediately below the curing device 540. The vibration suppression unit 555 is configured such that, for example, two rollers are in contact with the optical fiber 10A in different directions and suppress vibration of the optical fiber 10A. By suppressing vibration of the optical fiber 10A by using the vibration suppression unit 555, the position of the central axis of the glass fiber 13A can be maintained stably. That is, eccentricity of the glass fiber 13A can be suppressed.

In the present embodiment, as shown in FIG. 5, the direct-under roller 552a located immediately below the curing device 540 is fixed independently of other apparatus members related to the production of the optical fiber 10A. Specifically, the direct-under roller 552a is, for example fixed to the floor without being connected to other apparatus members. As the direct-under roller 552a is used in a state of being fixed independently of other apparatus members related to the production of the optical fiber 10A, the direct-under roller 552a can be suppressed from receiving vibration from other apparatus members. As a result, in a spectrum obtained by Fourier transforming the eccentric amount waveform of the glass fiber 13A, the maximum value of the amplitude of the eccentric amount can be made small, and the wavelength at which the amplitude of the eccentric amount is the maximum can be made longer.

In the description given above, in order to produce an optical fiber 10A that satisfies the above-described requirement of the eccentric amount of the glass fiber 13A, it is intended to carry out all of the following (x), (y), and (z); however, the invention is not limited to this case.

(x) Among all rollers including a direct-under roller 552a located immediately below a curing device 540 and a plurality of guide rollers 552 downstream of the direct-under roller 552a, the circumferential length of the largest roller is set to 0.2 m or more.

(y) Vibration of the optical fiber 10A is suppressed by a vibration suppression unit 555 provided downstream of the curing device 540 and upstream of the direct-under roller 552a located immediately below the curing device 540.

(z) The direct-under roller 552a located immediately below the curing device 540 is used in a state of being fixed independently of other apparatus members related to the production of the optical fiber 10A.

When at least any one of (x), (y), and (z) is carried out, the above-mentioned effect can be significantly obtained. However, the above-mentioned effect can be stably obtained when most of the above-described (x), (y), and (z) are carried out.

In the present embodiment, when a first eccentric amount of the glass fiber 13A from the central axis with respect to the outer periphery of the primary resin layer 14 is measured, and a second eccentric amount of the glass fiber 13A from the central axis with respect to the outer periphery of the secondary resin layer 15 is measured, both at a plurality of measurement points set at predetermined intervals in the axial direction of the glass fiber 13A, the average value of the first eccentric amount may be smaller than the average value of the second eccentric amount. In this case, the eccentric amount of the primary resin layer 14 having a buffer effect becomes small, and the lateral pressure resistance characteristics are enhanced. The plurality of measurement points is, for example, 5 or more points.

Second Example

Next, an Example of a second embodiment will be described. These Examples are only examples of the present disclosure, and the present disclosure is not intended to be limited by these Examples.

First, optical fibers of Sample Nos. 15 to 20 were produced under the conditions described in the following Table 6. Common conditions that are not described in Table 6 are as follows.

Outer diameter of glass fiber 13A: 125 μm

Number of layers of coating resin layer 16A: 2 layers

The compositions and thicknesses of the primary resin layer and the secondary resin layer of Sample Nos. 15 to 18 are the same as those of Sample No. 1 m Table 1.

[Measurement of Eccentric Amount]

The eccentric amount of the glass fiber 13A was measured at a plurality of measurement points set at predetermined intervals in the axial direction of the glass fiber 13A by using an eccentric amount variation observation apparatus, and thus a waveform of the eccentric amount with respect to the position of each of the plurality of measurement points was obtained. Subsequently, the eccentric amount waveform of the optical fiber 10A was subjected to Fourier transformation (FFT: fast fourier transformation), and a spectrum obtained by the Fourier transformation was analyzed. In the spectrum obtained by Fourier transforming the eccentric amount waveform as such, the "maximum value of the amplitude of the eccentric amount" and the "wavelength at which the amplitude of the eccentric amount is the maximum" were determined. The "wavelength at which the amplitude of the eccentric amount is the maximum" is described as "wavelength of maximum amplitude component" in the following description.

[Measurement of Frequency of Wire Breaking]

During the production process for the optical fiber 10A of each of the above-mentioned samples, the optical fiber 10A was rewound by applying a tension of 1.5 kg, and the number of times of wire breaking of the optical fiber 10A was measured. For each of the samples, the frequency of wire breaking was determined as the number of times of wire breaking per 1000 kilometers (Mm). As a result, a case in which the frequency of wire breaking was less than 5 times/Mm was rated as "satisfactory", and a case in which the frequency of wire breaking was 5 or more times/Mm was rated as "defective". The results obtained by performing an evaluation of each of the samples will be described with reference to the following Table 6.

the eccentric amount became larger, or the wavelength at which the amplitude of the eccentric amount was the maximum became shorter. As a result, it is considered that the frequency of wire breaking increased in Sample Nos. 19 and 20. It is considered that as the optical fiber 10A had a thinner diameter, wire breaking was more likely to occur.

[Sample Nos. 15 to 18]

In contrast, with regard to Sample Nos. 15 to 18, in the spectra obtained by Fourier transforming the eccentric amount waveform, the maximum value of the amplitude of the eccentric amount was 6 µm or less. In the spectra obtained by Fourier transforming the eccentric amount waveform, the wavelength at which the amplitude of the eccentric amount was the maximum was 0.1 m or more.

As a result, with regard to Sample Nos. 15 to 18, the optical fiber 10A was less likely to break, and the frequency of wire breaking was less than 5 times/Mm. With regard to Sample Nos. 15 to 18, since the circumferential length of the largest guide roller was set to 0.2 m or more, the optical fiber 10A could be stably conveyed by means of this largest guide roller. With regard to Sample Nos. 15 and 16, as a result of providing the vibration suppression unit 555, when coating

TABLE 6

| | Production conditions | | | | Evaluation results | | |
|---|---|---|---|---|---|---|---|
| Sample No. | Outer periphery diameter of resin coating layer | Circumferential length of largest guide roller | Vibration control unit | Independent fixing of direct-under roller | Maximum value of amplitude of eccentric amount | Wavelength of maximum amplitude component | Frequency of wire breaking (times/Mm) |
| 15 | 170 µm | 0.3 m | Present | Present | 0.9 µm | 0.42 m | 0.1 |
| 16 | 170 µm | 0.2 m | Present | Present | 3.6 µm | 0.12 m | 1.8 |
| 17 | 170 µm | 0.2 m | Absent | Present | 5.2 µm | 0.13 m | 2.0 |
| 18 | 170 µm | 0.2 m | Absent | Absent | 6.0 µm | 0.1 m | 4.1 |
| 19 | 190 µm | 0.15 m | Absent | Absent | 7.0 µm | 0.06 m | 14 |
| 20 | 250 µm | 0.15 m | Absent | Absent | 6.9 µm | 0.06 m | 5.0 |

[Sample Nos. 19 and 20]

Regarding Sample Nos. 19 and 20, in the spectra obtained by Fourier transforming the eccentric amount waveform, the maximum value of the amplitude of the eccentric amount was more than 6 µm. In the spectra obtained by Fourier transforming the eccentric amount waveform, the wavelength at which the amplitude of the eccentric amount was maximum was less than 0.1 m. As a result, in Sample Nos. 19 and 20, the optical fiber 10A was likely to break, and the frequency of wire breaking was 5 or more times/Mm. Sample No. 19 having a relatively smaller diameter tended to have a higher frequency of wire breaking compared with Sample No. 20 having a conventional outer diameter.

With regard to Sample Nos. 19 and 20, since the circumferential length of the largest guide roller was set to be less than 0.2 m, the optical fiber 10A could not be stably conveyed by this largest guide roller. With regard to Sample Nos. 19 and 20, since the vibration suppression unit 555 was not provided, when coating with the coating resin layer 16A, the position of the central axis of the glass fiber 13A was significantly deviated or was deviated with a short period, due to the vibration from the conveyance unit 550. For Sample Nos. 19 and 20, since the direct-under roller 552a was used in a state of being connected to other apparatus members, the vibration of the direct-under roller 552a was large, or vibration with a short period occurred.

Due to these, with regard to Sample Nos. 19 and 20, in the spectra obtained by Fourier transforming the eccentric amount waveform, the maximum value of the amplitude of with the coating resin layer 16A, the position of the central axis of the glass fiber 13A could be stably maintained by suppressing the vibration of the optical fiber 10A. With regard to Sample Nos. 15 to 17, an increase in the vibration of the direct-under roller 552a and shortening of the period could be suppressed by using the direct-under roller 552a in a state of being fixed independently of other apparatus members.

Due to these, with regard to Sample Nos. 15 to 18, in the spectra obtained by Fourier transforming the eccentric amount waveform, the maximum value of the amplitude of the eccentric amount could be made smaller, and the wavelength at which the amplitude of the eccentric amount was the maximum could be made longer. As a result, with regard to Sample Nos. 15 to 18, it was confirmed that despite having smaller diameters than Sample No. 19, the frequency of wire breaking could be lowered.

Third Embodiment

Figure 6:
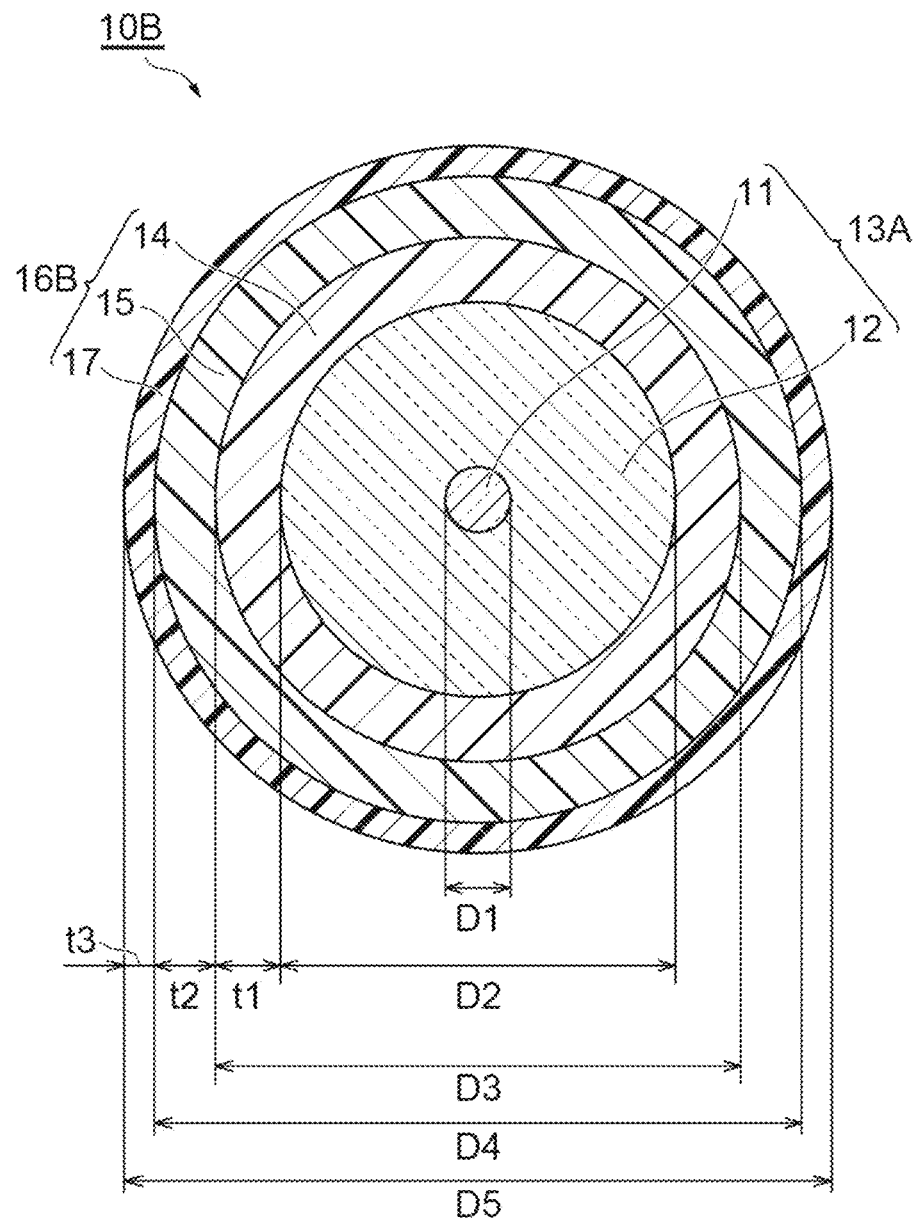
FIG. 6 is a diagram illustrating a cross-section perpendicular to the axial direction of an optical fiber according to a third embodiment.

FIG. 6 is a diagram illustrating a cross-section perpendicular to the axial direction of an optical fiber 10B according to a third embodiment. The optical fiber 10B is a so-called optical fiber core line and includes a glass fiber 13A including a core 11 and a cladding 12; and a coating resin layer 16B including a primary resin layer 14, a secondary resin layer 15, and a colored layer 17 (first colored layer) provided on the outer periphery of the glass fiber 13A. Among these constituent elements, the structures and characteristics of the glass fiber 13A and the secondary resin layer 15 are similar to those of the above-mentioned first embodiment.

The colored layer 17 is in contact with the outer peripheral surface of the secondary resin layer 15 and surrounds the entirety of the secondary resin layer 15. The colored layer 17 constitutes the outermost layer of the coating resin layer 16B. The colored layer 17 is formed from, for example, an ultraviolet-cured resin including a pigment. The thickness t3 of the colored layer 17 is 3.0 μm or more and 10.0 μm or less. The outer diameter D5 of the colored layer 17, that is, the outer diameter of the coating resin layer 16B, is 180 μm±5 μm, that is, 175 μm or more and 185 μm or less. The colored layer 17 is formed from a cured product of a resin composition including a colored ink. When the coating resin layer 16B has a colored layer 17 as is the case of the present embodiment, identification of the optical fiber 10B is made easier by the colored layer 17.

When the thickness t3 of the colored layer 17 is 3.0 μm or more, the color of the core line in the external appearance becomes sufficiently dark, and the identifiability is enhanced. In addition, unevenness caused by the vibration of the optical fiber 10B in the production process can be suppressed. Since a pigment is included in the colored layer 17, when the colored layer 17 has an excessive thickness, ultraviolet radiation for curing the colored layer 17 does not sufficiently reach to the core part of the colored layer 17, and there is a risk that the colored layer 17 may be insufficiently cured. When curing of the colored layer 17 is insufficient, the adhesive force between the colored layer 17 and the secondary resin layer 15 is decreased, and at the time of peeling a tape material, there occurs so-called "color peeling", in which the colored layer 17 is not separated from the tape material but is separated from the secondary resin layer 15. When the thickness t3 of the colored layer 17 is 10.0 μm or less, ultraviolet radiation for curing the colored layer 17 sufficiently reaches to the core part of the colored layer 17, and the above-mentioned "color peeling" can be reduced.

In the optical fiber 10B of the present embodiment, the Young's modulus of the primary resin layer 14 becomes slightly larger compared with the first embodiment, as a result of irradiation with ultraviolet radiation for curing the colored layer 17. This is speculated to be because the primary resin layer 14 is further cured by the irradiation with ultraviolet radiation for curing the colored layer 17.

That is, with regard to the optical fiber 10B of the present embodiment, the Young's modulus of the primary resin layer 14 may be 0.10 MPa or greater and 0.40 MPa or less at 23° C. When the Young's modulus of the primary resin layer 14 is 0.10 MPa or greater, coating cracks called voids and peeling (delamination) of the coating are less likely to occur in the primary resin layer 14 at a screening tension of 1.5 kg or greater. This optical fiber 10B has no problem with low-temperature characteristics. When the Young's modulus of the primary resin layer 14 is 0.40 MPa or less, especially excellent lateral pressure resistance characteristics are obtained within the range of the thickness t1 of the primary resin layer 14 described in the first embodiment. In the following description, an optical fiber 10B including a primary resin layer 14 having a Young's modulus of 0.10 MPa or greater and 0.40 MPa or less may be referred to as a lateral pressure resistance-specialized type optical fiber (this optical fiber is an optical fiber having a colored layer on two coating layers).

According to another aspect of the present embodiment, the Young's modulus of the primary resin layer 14 may be 0.40 MPa or greater and 0.60 MPa or less at 23° C. When the Young's modulus of the primary resin layer 14 is 0.40 MPa or greater, coating cracks called voids and peeling (delamination) of the coating are less likely to occur in the primary resin layer 14 at a screening tension of 2.0 kg or greater, wire breaking is further less likely to occur during tape formation and cable formation, and productivity is enhanced. When the Young's modulus of the primary resin layer 14 is 0.60 MPa or less, sufficient lateral pressure resistance characteristics are obtained within the range of the thickness t1 of the primary resin layer 14 described in the first embodiment. In the following description, an optical fiber 10B including a primary resin layer 14 having a Young's modulus of 0.40 MPa or greater and 0.60 MPa or less may be referred to as a high screening tension type optical fiber (this optical fiber is an optical fiber having a colored layer on two coating layers).

According to the present embodiment, the structure and characteristics of the primary resin layer 14 except for the Young's modulus are similar to those of the above-mentioned first embodiment.

Third Example

Hereinafter, the results of an evaluation test performed using Examples and Comparative Examples according to the third embodiment will be shown. Meanwhile, the present invention is not intended to be limited to these Examples.

A plurality of samples of the optical fiber 10B were produced by forming a primary resin layer 14 on the outer periphery of a glass fiber 13A composed of a core 11 and a cladding 12 and having a diameter of 125 μm, further forming a secondary resin layer 15 on the outer periphery of the primary resin layer 14, and further forming a colored layer 17 on the outer periphery of the secondary resin layer 15. The following Table 7 and Table 8 are tables indicating the outer diameter, thickness, and Young's modulus at 23° C. of the primary resin layer 14, the outer diameter, thickness, and Young's modulus at 23° C. of the secondary resin layer 15, the lateral pressure resistance characteristics, the screening tension, and other characteristics for each of the produced samples.

TABLE 7

| | | Lateral pressure resistance-specialized type | | | | | High screening tension type | | | |
|---|---|---|---|---|---|---|---|---|---|---|
| | Sample No. | 21 | 22 | 23 | 24 | 25 | 26 | 27 | 28 | 29 |
| Outer | Primary | 150 | 160 | 140 | 140 | 160 | 150 | 160 | 140 | 160 |
| diameter [μm] | Secondary | 170 | 170 | 170 | 175 | 170 | 170 | 170 | 170 | 170 |
| | Colored layer | 180 | 180 | 180 | 180 | 180 | 180 | 180 | 180 | 180 |
| Thickness [μm] | Primary | 12.5 | 17.5 | 7.5 | 7.5 | 17.5 | 12.5 | 17.5 | 7.5 | 17.5 |
| | Secondary | 10 | 5 | 15 | 17.5 | 5 | 10 | 5 | 15 | 5 |
| Young's | Primary | 0.25 | 0.15 | 0.10 | 0.10 | 0.40 | 0.50 | 0.60 | 0.50 | 0.40 |
| modulus [MPa] | Secondary | 1200 | 1200 | 2800 | 2800 | 2800 | 2000 | 2800 | 2800 | 1200 |

TABLE 7-continued

|  | Lateral pressure resistance-specialized type | | | | | High screening tension type | | | |
|---|---|---|---|---|---|---|---|---|---|
| Sample No. | 21 | 22 | 23 | 24 | 25 | 26 | 27 | 28 | 29 |
| Lateral pressure resistance characteristics | A | A | A | A | A | B | B | B | B |
| Screening tension | B | B | B | B | B | A | A | A | A |
| Other characteristics | — | — | — | — | — | — | — | — | — |

TABLE 8

|  |  | Reference Example | | | | |
|---|---|---|---|---|---|---|
| Sample No. | | 30 | 31 | 32 | 33 | 34 |
| Outer diameter [μm] | Primary | 150 | 165 | 135 | 150 | 150 |
|  | Secondary | 170 | 170 | 170 | 170 | 170 |
|  | Colored layer | 180 | 180 | 180 | 180 | 180 |
| Thickness [μm] | Primary | 12.5 | 20 | 5 | 12.5 | 12.5 |
|  | Secondary | 10 | 2.5 | 17.5 | 10 | 10 |
| Young's [MPa] modulus | Primary | 0.75 | 0.15 | 0.25 | 0.15 | 0.08 |
|  | Secondary | 1200 | 2800 | 1200 | 2900 | 1100 |
| Lateral pressure resistance characteristics | | C | A | C | A | A |
| Screening tension | | A | C | A | C | C |
| Other characteristics | | — | Multiple occurrences of wire breaking | — | Secondary cracking and defective external appearance | — |

In the present Example, the specific compositions of the primary resin layer 14 and the secondary resin layer 15 are similar to those of the First Example. However, the Young's modulus of the primary resin layer 14 becomes slightly (up to 0 MPa to about 0.1 MPa) larger than the First Example, as a result of irradiation with ultraviolet radiation at the time of curing the colored layer 17. The method for measuring the Young's moduli of the primary resin layer 14 and the secondary resin layer 15, the measurement method and the evaluation criteria for the lateral pressure resistance characteristics, and the measurement method and the evaluation criteria for the screening tension are also similar to the First Example.

According to this Example, when the thickness of the primary resin layer 14 is 7.5 μm or more and 17.5 μm or less, the thickness of the secondary resin layer 15 is 5.0 μm or more and 17.5 μm or less, the Young's modulus of the primary resin layer is 0.10 MPa or greater and 0.60 MPa or less, and the Young's modulus at 23° C. of the secondary resin layer is 1200 MPa or greater and 2800 MPa or less, the rating for the lateral pressure resistance characteristics is A or B, while the rating for the screening tension is A or B, and an optical fiber 10B having a smaller diameter, in which deterioration of the lateral pressure resistance characteristics and tension resistance (low-temperature characteristics) is suppressed, can be provided. Particularly, when the Young's modulus of the primary resin layer is 0.10 MPa or greater and 0.40 MPa or less, a lateral pressure resistance-specialized type optical fiber 10B whose rating for the lateral pressure resistance characteristics is A, can be provided. Particularly, when the Young's modulus of the primary resin layer is 0.40 MPa or greater and 0.60 MPa or less, a high screening tension type (low-temperature characteristics-specialized type) optical fiber 10B whose rating for the screening tension is A, can be provided. As the screening tension is higher, the optical fiber 10B is less likely to break in a tape-forming step, which is a subsequent step, and the product yield for a multicore cable is enhanced.

As shown in Table 8, when the thickness of the secondary resin layer 15 is set to be less than 5.0 μm, wire breaking of the optical fiber 10B occurred multiple times. When the Young's modulus of the secondary resin layer 15 is greater than 2800 MPa, the coating became brittle, cracking occurred in the secondary resin layer 15, and the optical fiber 10B had defective external appearance.

Modification Example

Figure 7:
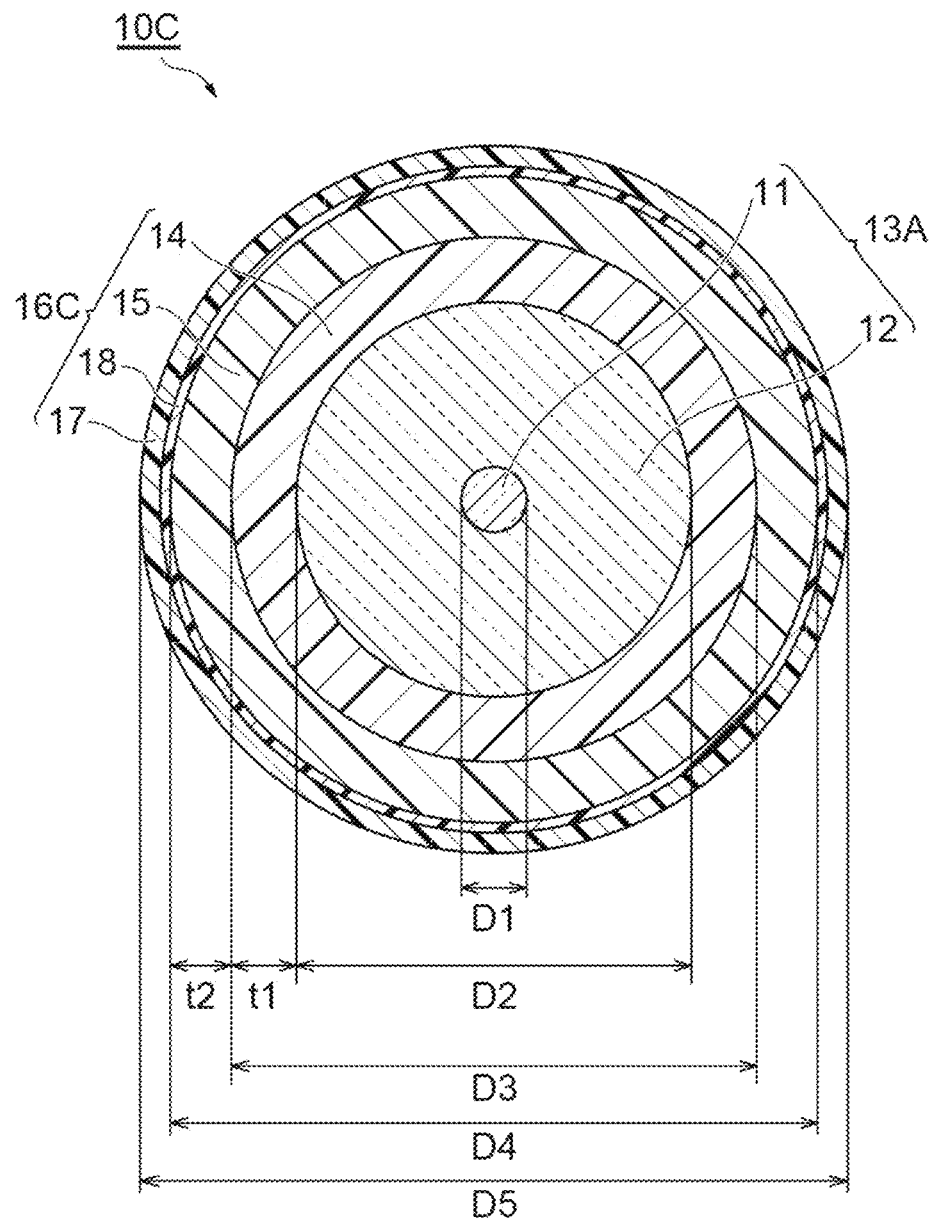
FIG. 7 is a diagram illustrating a cross-section perpendicular to the axial direction of the optical fiber as a modification example of the third embodiment.

FIG. 7 is a diagram illustrating a cross-section perpendicular to the axial direction of an optical fiber 10C as a Modification Example of the third embodiment. The optical fiber 10C includes a coating resin layer 16C instead of the coating resin layer 16B of the third embodiment. The coating resin layer 16C further has a colored layer 18 (second colored layer) in addition to the configuration of the coating resin layer 16B of the third embodiment. The colored layer 18 is a resin layer that is formed between the secondary resin layer 15 and the colored layer 17 and has a color different from that of the colored layer 17. The colored layer 18 includes a plurality of ring patterns formed to be arranged mutually at an interval in the axial direction of the glass fiber 13A. The colored layer 18 is formed by, for example, an inkjet method of injecting a solvent dilution type ink. Since a solvent dilution type ink has a property of being removed by wiping by means of an alcohol or the like, the colored layer 18 is formed on the outer surface of the secondary resin layer 15, and the colored layer 17 is formed thereon to surround the colored layer 18. The colored layer 18 is a layer in which the thickness is discontinuous in the length direction of the optical fiber. When the optical fiber 10C is viewed along the length direction, there are also sites without the colored layer 18.

According to the present Modification Example, the number of identifiable colors of the optical fiber core line can be increased as many as the number of combinations of the number of colors of the colored layer 17 and the number of colors of the colored layer 18. Therefore, the number of identifiable colors of the optical fiber core line can be remarkably increased.

Fourth Embodiment

Figure 8:
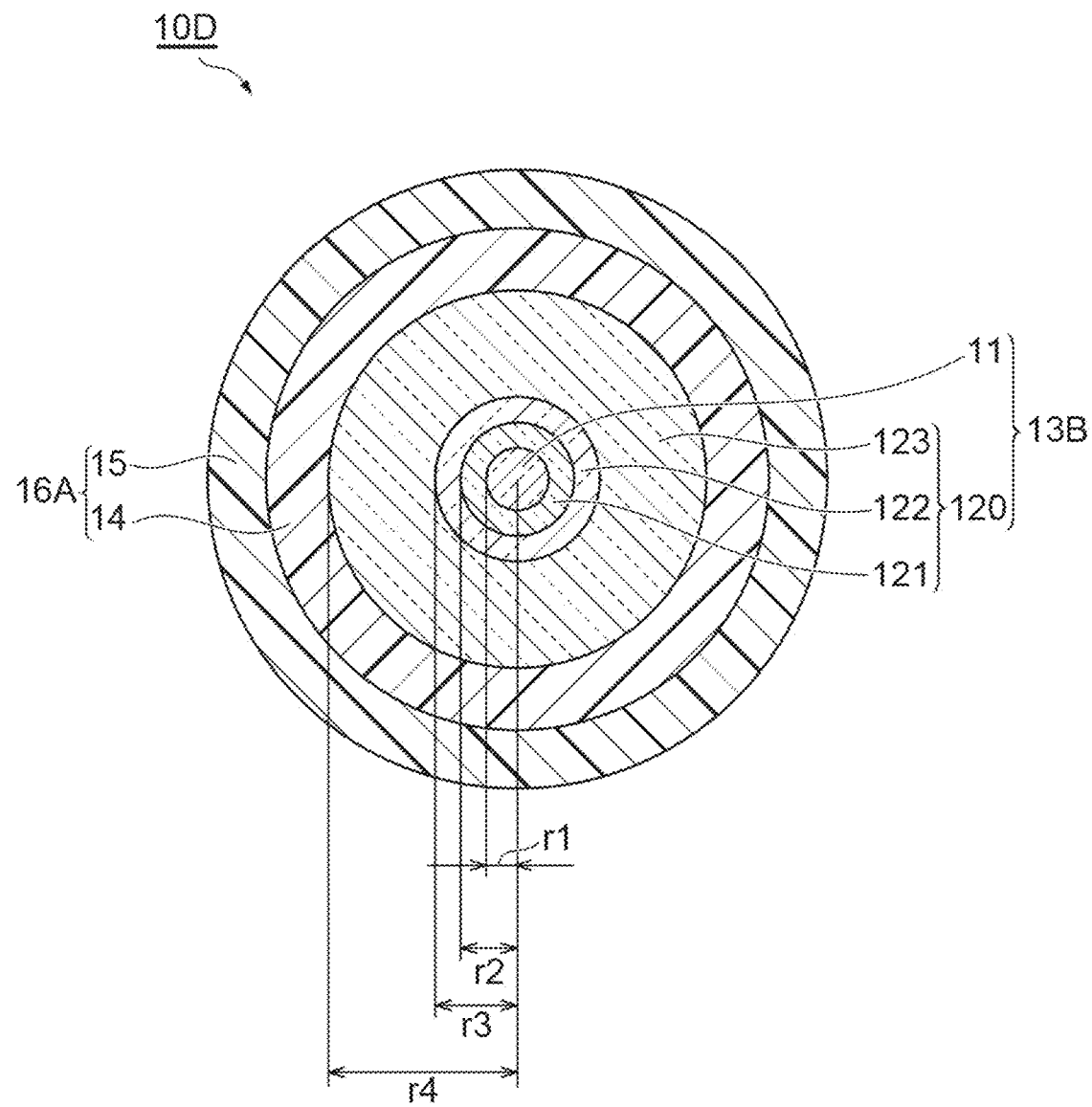
FIG. 8 is a diagram illustrating a cross-section perpendicular to the axial direction of an optical fiber of the present embodiment.

Subsequently, the structure of a glass fiber intended for further reducing the microbending loss while attempting to make the diameter smaller will be described. FIG. 8 is a diagram illustrating a cross-section perpendicular to the axial direction of the optical fiber 10D of the present embodiment. The optical fiber 10D is a so-called optical fiber element line and includes a glass fiber 13B including a core 11 and a cladding 120; and a coating resin layer 16A including a primary resin layer 14 and a secondary resin layer 15 provided on the outer periphery of the glass fiber 13B. The configuration of the coating resin layer 16A is similar to that of the above-mentioned first embodiment. The coating resin layer 16B of the third embodiment may be employed instead of the coating resin layer 16A, and the optical fiber 10D may be employed as the optical fiber core line.

The cladding 120 surrounds the core 11. The core 11 and the cladding 120 mainly includes glass such as quartz glass. The core 11 is formed from, for example, a material obtained by adding germanium (Ge) to pure quartz glass. Here, pure quartz glass substantially does not include impurities. The cladding 120 includes an inner cladding 121 that surrounds the outer periphery of the core 11 and is in contact with the outer peripheral surface of the core 11; a trench 122 that surrounds the outer periphery of the inner cladding 121 and is in contact with the outer peripheral surface of the inner cladding 121; and an outer cladding 123 that surrounds the outer periphery of the trench 122 and is in contact with the outer peripheral surface of the trench 122. For the inner cladding 121, quartz glass with added chlorine (Cl) can be used. The mean chlorine mass concentration of the inner cladding 121 is, for example, 500 ppm or more and 5000 ppm or less, for example, 500 ppm or more and 3000 ppm or less. For the trench 122, quartz glass with added fluorine can be used. For the outer cladding 123, pure quartz glass can be used. Alternatively, the outer cladding 123 may also be quartz glass with added chlorine as in the case of the inner cladding 121. The mean OH mass concentration of the outer cladding 123 is 500 ppm or less, for example, 200 ppm or less. The OH mass concentration may be set to zero. By sintering the outer cladding 123 in a vacuum atmosphere, an optical fiber in which the outer cladding 123 does not include chlorine, and the OH mass concentration is 5 ppm to 500 ppm, is realized.

Figure 9:
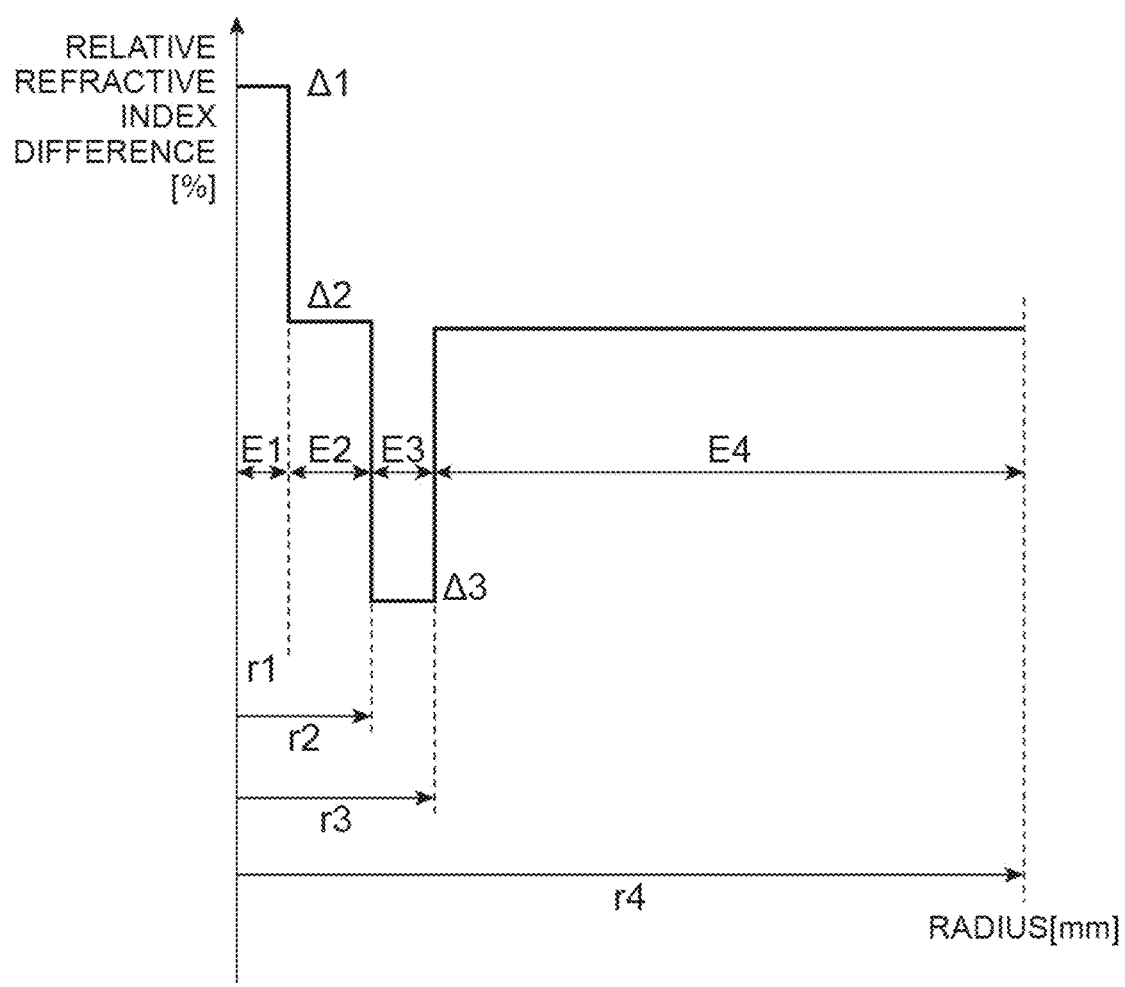
FIG. 9 is a diagram illustrating a refractive index distribution in the radial direction of a glass fiber.

FIG. 9 is a diagram showing the refractive index distribution (portion outside from the center of the glass fiber) in the radial direction of the glass fiber 13B. In FIG. 9, the range E1 corresponds to the core 11; range E2 corresponds to the inner cladding 121; range E3 corresponds to the trench 122; and range E4 corresponds to the outer cladding 123. The axis of ordinate represents the relative refractive index difference, and the axis of abscissa represents the position in the radial direction. As shown in FIG. 9, with regard to the glass fiber 13B, the relative refractive index differences of the core 11, the inner cladding 121, and the trench 122 with respect to the refractive index of the outer cladding 123 are denoted by $\Delta 1$, $\Delta 2$, and $\Delta 3$, respectively. At this time, the relative refractive index difference $\Delta 2$ of the inner cladding 121 is smaller than the relative refractive index difference $\Delta 1$ of the core 11. In other words, the refractive index of the inner cladding 121 is smaller than the refractive index of the core 11. The relative refractive index difference $\Delta 3$ of the trench 122 is smaller than the relative refractive index difference $\Delta 2$ of the inner cladding 121. In other words, the refractive index of the trench 122 is smaller than the refractive index of the inner cladding 121. The sign of the relative refractive index difference $\Delta 3$ of the trench 122 is negative, and the sign of the relative refractive index difference $\Delta 1$ of the core 11 is positive. The sign of the relative refractive index difference being negative means that the refractive index is smaller than the refractive index of the outer cladding 123.

The value $(\Delta 1 - \Delta 2)$ obtained by subtracting the relative refractive index difference $\Delta 2$ of the inner cladding 121 from the relative refractive index difference $\Delta 1$ of the core 11 is 0.15% or more and 0.40% or less. According to an Example, the value $(\Delta 1 - \Delta 2)$ is 0.34%. As the value $(\Delta 1 - \Delta 2)$ is relatively small as such, an enlargement of the mode field diameter of the optical fiber 10D can be attempted. The absolute value $|\Delta 2|$ of the relative refractive index difference $\Delta 2$ of the inner cladding 121 is 0.10% or less. The relative refractive index difference $\Delta 3$ of the trench 122 is −0.70% or more and −0.20% or less. When the relative refractive index difference $\Delta 3$ of the trench 122 is in such a range, it is not necessary to add an extremely large amount of fluorine in the step of sintering glass. The relative refractive index difference $\Delta 3$ of the trench 122 may be smaller than −0.25%.

As shown in FIG. 8 and FIG. 9, the radius of the outer periphery of the core 11 is designated as r1, the radius of the outer periphery of the inner cladding 121 is designated as r2, and the radius of the outer periphery of the trench 122 is designated as r3. At this time, the value (r2/r1) obtained by dividing the radius r2 of the inner cladding 121 by the radius r1 of the core 11 is 2.2 or more and 3.6 or less. The value (r3−r2) obtained by subtracting the radius r2 of the inner cladding 121 from the radius r3 of the trench 122 is 3 µm or more and 10 µm or less. The value (r3−r2) may be larger than 4.5 µm. The outer diameter of the outer cladding 123, that is, the outer diameter of the glass fiber 13B, is within the range of 125 µm±0.5 µm, similarly to each of the above-described embodiments.

In the optical fiber 10D, the mode field diameter for light having a wavelength of 1310 nm is 9.2 µm±0.4 µm, that is, 8.8 µm or more and 9.6 µm or less. The mode field diameter is based on the definition of Petermann-I. The bending loss for light having a wavelength of 1625 nm when the optical fiber 10D is wound around a mandrel having a diameter of 15 mm is 1.0 dB or less per one turn. The bending loss for light having a wavelength of 1625 nm when the optical fiber 10D is wound around a mandrel having a diameter of 30 mm is 0.1 dB or less per 10 turns. The bending loss for light having a wavelength of 1625 nm when the optical fiber 10D is wound around a mandrel having a diameter of 100 mm is $1.0 \times 10^{-5}$ dB or less per one turn. When the value (r2/r1) obtained by dividing the radius r2 of the inner cladding 121 by the radius r1 of the core 11 is 3.6 or less, such bending loss characteristics can be realized. Thus, the optical fiber 10D satisfies the level of bending loss specified in G.657.A2 while having a mode field diameter of 9.2 µm as the center, with the mode field diameter being extended as compared with conventional ones (optical fibers having only one stage in the respective refractive index distributions of the core and the cladding). Since the bending loss at the time of being wound on a diameter of 100 mm is very small to the extent that is unmeasurable, the bending loss at several bend diameters in the range of from 20 mm to 60 mm is measured, and the bending loss at a diameter of 100 mm is calculated by extrapolation based on the dependency of the bending loss on the bend diameter.

The zero-dispersion wavelength of the optical fiber 10D is 1300 nm or more and 1324 nm or less. That is, the zero-dispersion wavelength of the optical fiber 10D conforms to the specifications of G.657.A2. When the value (r2/r1) obtained by dividing the radius r2 of the inner cladding 121 by the radius r1 of the core 11 is 2.2 or more, such a zero-dispersion wavelength can be realized. The wavelength dispersion of the optical fiber 10D with respect to light having a wavelength of 1550 nm is 18.6 ps/(nm·km) or less. The zero-dispersion slope of the optical fiber 10D is 0.092 ps/(nm²·km) or less.

The cable cutoff wavelength of the optical fiber 10D is 1260 nm or less. That is, the cable cutoff wavelength of the optical fiber 10D conforms to the specifications of G.657.A2.

The transmission loss of the optical fiber 10D with respect to light having a wavelength of 1383 nm is 0.35 dB/km or less. In other words, the mean OH mass concentrations of the core 11 and the cladding 120 are as small as to the extent that the transmission loss with respect to light having a wavelength of 1383 nm becomes 0.35 dB/km or less. As the transmission loss is within this range, it is possible to extend the wavelength range that can be used for information transmission in an optical communication system.

When the standard deviation of the variation of the outer diameter of the glass fiber 13B in the axial direction is designated as σ, 3σ is, for example, 0.1 μm or more and 0.5 μm or less. Here, the standard deviation σ represents the fluctuation in the variation in the length direction (that is, variation of the outer diameter) of the measured value when measurement is made at a constant interval (for example, an interval of 1 m) in the longitudinal direction. The value 3σ may fall in the range of 0.2 μm or more and 0.5 μm or less. The variation of the outer diameter needs to be a predetermined value or less, in order to satisfy the international standard of the glass diameter.

Figure 10:
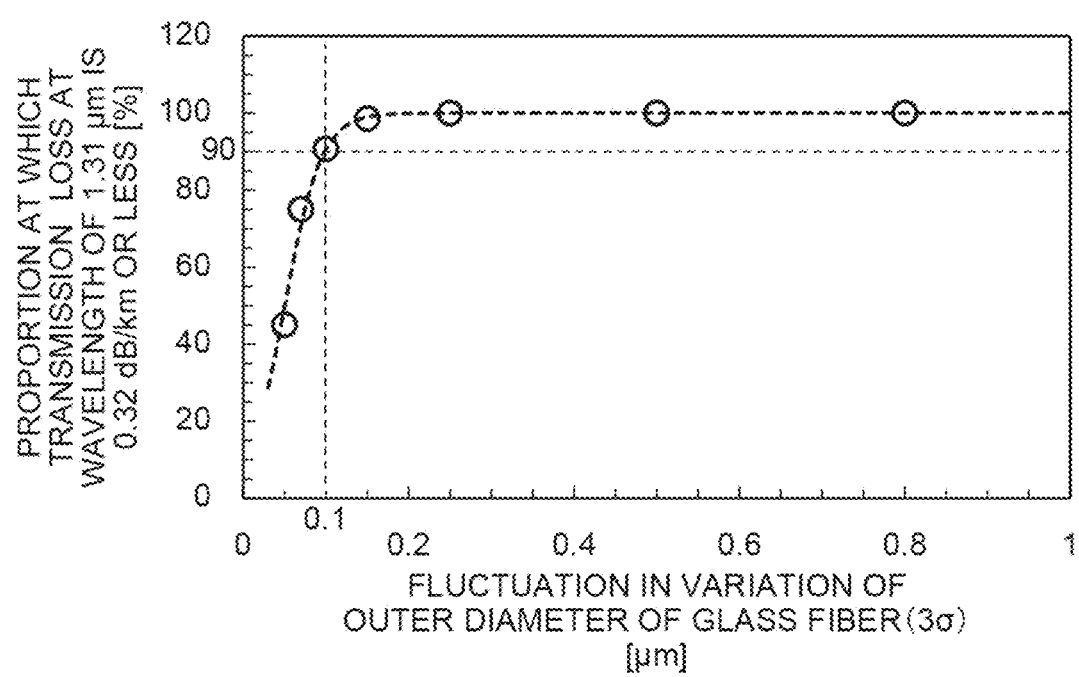
FIG. 10 is a graph showing the relationship between the fluctuation (3σ) in the variation of the outer diameter of the glass fiber and the proportion of optical fibers whose transmission loss at a wavelength of 1.31 μm is 0.32 dB/km or less.

FIG. 10 is a graph showing the relationship between the fluctuation (3σ) in the variation of the outer diameter of the glass fiber 13B and the proportion of the optical fibers whose transmission loss at a wavelength of 1.31 μm is 0.32 dB/km or less. As is obvious from FIG. 10, it can be seen that when the fluctuation (3σ) in the variation of the outer diameter is 0.1 μm or more, the proportion of optical fibers whose transmission loss is 0.32 dB/km or less is more than 90%, and the transmission loss is suppressed to a sufficiently low level. There is a correlation between the fluctuation in the variation of the outer diameter and the transmission loss at a wavelength of 1.31 μm, and as the fluctuation in the variation of the outer diameter is smaller, the transmission loss at a wavelength of 1.31 μm is larger. By causing the variation of the outer diameter to slightly fluctuate (3σ is set to be 0.1 μm or more and 0.5 μm or less), the transmission loss at a wavelength of 1.31 μm can be suppressed to the extent that there is no problem with the variation of the outer diameter.

Here, dimensions and characteristics of the optical fibers related to Sample Nos. 35 and 36 as Examples are shown in Table 9. Meanwhile, the radius of the outer cladding 123 is 62.5 μm in both cases.

Fourth Example

Hereinafter, the results of an evaluation test performed using Examples and Comparative Examples according to the fourth embodiment will be shown. Meanwhile, the present invention is not intended to be limited to these Examples.

A plurality of samples of the optical fiber 10D were produced by forming a primary resin layer 14 on the outer periphery of a glass fiber 13B composed of a core 11 and a cladding 120 and having a diameter of 125 μm, and further forming a secondary resin layer 15 on the outer periphery of the primary resin layer 14. The following Table 10 is a table indicating the outer diameter, thickness, and Young's modulus at 23° C. of the primary resin layer 14, the outer diameter, thickness, and Young's modulus at 23° C. of the secondary resin layer 15, the lateral pressure resistance characteristics, and the screening tension for each of the produced samples. The structure of the glass fibers 13B of Sample Nos. 37 and 38 was made identical with that of Sample No. 35 in Table 9, and the structure of the glass fiber 13B of Sample No. 39 was made identical with that of Sample No. 36 in Table 9.

TABLE 10

| Sample No. | | 37 | 38 | 39 |
|---|---|---|---|---|
| Outer diameter | Primary | 160 | 140 | 160 |
| [μm] | Secondary | 170 | 170 | 170 |
| Thickness | Primary | 17.5 | 7.5 | 17.5 |
| [μm] | Secondary | 5 | 15 | 5 |
| Young's modulus | Primary | 0.50 | 0.40 | 0.30 |
| [MPa] | Secondary | 2800 | 2800 | 1200 |
| Lateral pressure resistance characteristics | | A | A | A |
| Screening tension | | A | A | A |

The compositions of the primary resin layer 14 and the secondary resin layer 15 of Sample No. 37 are identical with those of resin P3 and resin S2 of the First Example, respectively. The compositions of the primary resin layer 14 and the secondary resin layer 15 of Sample No. 38 are identical with those of resin P2 and resin S2 of the First Example, respectively. The compositions of the primary resin layer 14 and the secondary resin layer 15 of Sample No. 39 are identical with those of resin P2 and resin S1 of the First Example, respectively.

TABLE 9

| | | Unit | Sample 35 | Sample 36 |
|---|---|---|---|---|
| Structural parameter | Core radius r1 | μm | 4.0 | 4.0 |
| | Inner cladding radius r2 | μm | 8.8 | 14.4 |
| | Trench radius r3 | μm | 14.8 | 18.4 |
| | Relative refractive index difference Δ1 | % | 0.35 | 0.34 |
| | Relative refractive index difference Δ2 | % | 0.02 | −0.03 |
| | Relative refractive index difference Δ3 | % | −0.30 | −0.40 |
| | r2/r1 | — | 2.2 | 3.6 |
| | Trench thickness (r3 − r2) | μm | 6.0 | 4.0 |
| Optical characteristics | MFD (wavelength 1.31 μm) | μm | 9.1 | 9.2 |
| | Wavelength dispersion (wavelength 1.55 μm) | ps/(nm · km) | 18.5 | 15.4 |
| | Zero-dispersion wavelength | nm | 1306 | 1317 |
| | Zero-dispersion slope | ps/(nm² · km) | 0.090 | 0.087 |
| | Cable cutoff | nm | 1231 | 1242 |
| | Bending loss at diameter of 15 mm (wavelength 1.625 μm) | dB/turn | 0.172 | 0.162 |
| | Bending loss at diameter of 30 mm (wavelength 1.625 μm) | dB/10 turns | 0.066 | 0.081 |
| | Transmission loss (wavelength 1.38 μm) | dB/km | ≤0.35 | ≤0.33 |
| | Transmission loss (wavelength 1.55 μm) | dB/km | ≤0.19 | ≤0.19 |

In the present Example, the Young's modulus, lateral pressure resistance characteristics, and screening tension of each of the primary resin layer 14 and the secondary resin layer 15 were determined by methods similar to those of the above-mentioned First Example. In this Example, similarly to the First Example, the thickness of the primary resin layer 14 is 7.5 μm or more and 17.5 μm or less, the thickness of the secondary resin layer 15 is 5.0 μm or more and 17.5 μm or less, the Young's modulus of the primary resin layer is 0.10 MPa or greater and 0.50 MPa or less, and the Young's modulus at 23° C. of the secondary resin layer is 1200 MPa or greater and 2800 MPa or less; however, the ratings for the lateral pressure resistance characteristics and the screening tension are A in all cases, so that an optical fiber 10D having a smaller diameter and having excellent tension resistance (low-temperature characteristics), in which deterioration of the lateral pressure resistance characteristics is further suppressed, can be provided.

A plurality of samples of optical fiber core lines, in which a colored layer 17 was added to the optical fiber 10D, were produced by forming a primary resin layer 14 on the outer periphery of a glass fiber 13B composed of a core 11 and a cladding 120 and having a diameter of 125 μm, forming a secondary resin layer 15 on the outer periphery of the primary resin layer 14, and further forming a colored layer 17 on the outer periphery of the secondary resin layer 15. The following Table 11 is a table indicating the outer diameter, thickness, and Young's modulus at 23° C. of the primary resin layer 14, the outer diameter, thickness, and Young's modulus at 23° C. of the secondary resin layer 15, the lateral pressure resistance characteristics, and the screening tension for each of the produced samples. The structure of the glass fibers 13B of Sample Nos. 40 and 41 was made identical with that of Sample No. 35 in Table 9, and the structure of the glass fiber 13B of Sample No. 42 was made identical with that of Sample No. 36 in Table 9.

TABLE 11

| Sample No. | | 40 | 41 | 42 |
|---|---|---|---|---|
| Outer diameter | Primary | 160 | 140 | 160 |
| [μm] | Secondary | 170 | 170 | 170 |
| | Colored layer | 180 | 180 | 180 |
| Thickness | Primary | 17.5 | 7.5 | 17.5 |
| [μm] | Secondary | 5 | 15 | 5 |
| Young's modulus | Primary | 0.60 | 0.50 | 0.40 |
| [MPa] | Secondary | 2800 | 2800 | 1200 |
| Lateral pressure resistance characteristics | | A | A | A |
| Screening tension | | A | A | A |

The compositions of the primary resin layer 14 and the secondary resin layer 15 of Sample No. 40 are identical with those of resin P3 and resin S2 of the First Example, respectively. The compositions of the primary resin layer 14 and the secondary resin layer 15 of Sample No. 41 are identical with those of resin P2 and resin S2 of the First Example, respectively. The compositions of the primary resin layer 14 and the secondary resin layer 15 of Sample No. 42 are identical with those of resin P2 and resin S1 of the First Example, respectively.

With regard to this Example as well, the Young's modulus, the lateral pressure resistance characteristics, and the screening tension of each of the primary resin layer 14 and the secondary resin layer 15 were determined by methods similar to those of the above-mentioned First Example. In this Example, similarly to the Second Example, the thickness of the primary resin layer 14 is 7.5 μm or more and 17.5 μm or less, the thickness of the secondary resin layer 15 is 5.0 μm or more and 17.5 μm or less, the Young's modulus of the primary resin layer is 0.10 MPa or greater and 0.60 MPa or less, and the Young's modulus at 23° C. of the secondary resin layer is 1200 MPa or greater and 2800 MPa or less; however, the ratings for the lateral pressure resistance characteristics and the screening tension are A in all cases, so that an optical fiber core line having excellent tension resistance (low-temperature characteristics) and having a smaller diameter, in which deterioration of the lateral pressure resistance characteristics is further suppressed, can be provided.

What is claimed is:

1. An optical fiber comprising:
   a glass fiber including a core and a cladding and having an outer diameter of 124.5 μm or more and 125.5 μm or less; and
   a coating resin layer for surrounding an outer periphery of the glass fiber, the coating resin layer having a primary resin layer and a secondary resin layer,
   wherein in the coating resin layer,
   the primary resin layer surrounds the outer periphery of the glass fiber,
   the secondary resin layer surrounds an outer periphery of the primary resin layer,
   the primary resin layer has a thickness of 7.5 μm or more and 17.5 μm or less,
   the primary resin layer has a Young's modulus of 0.10 MPa or greater and 0.50 MPa or less at 23° C.,
   the secondary resin layer has a thickness of 5.0 μm or more and 17.5 μm or less,
   the secondary resin layer has an outer diameter of 165 μm or more and 175 μm or less, and
   the secondary resin layer has a Young's modulus of 1200 MPa or greater and 2800 MPa or less at 23° C.,
   wherein in a spectrum obtained by measuring, at a plurality of measurement points set at predetermined intervals in an axial direction of the glass fiber, an eccentric amount of the glass fiber from a central axis based on the outer periphery of the secondary resin layer, the eccentric amount being measured based on a position of an outer periphery of the coating resin layer and a position of the outer periphery of the glass fiber that are obtained from an image of light penetrated through the optical fiber, and Fourier transforming a waveform representing the eccentric amount at each position of the plurality of measurement points, a maximum value of an amplitude of the eccentric amount is 6 μm or less, and
   wherein a wavelength at which the amplitude of the eccentric amount is largest is 0.1 m or more.

2. The optical fiber according to claim 1, wherein the primary resin layer has a Young's modulus of 0.10 MPa or greater and 0.30 MPa or less at 23° C.

3. The optical fiber according to claim 1, wherein the primary resin layer has a Young's modulus of 0.30 MPa or greater and 0.50 MPa or less at 23° C.

4. The optical fiber according to claim 1, wherein at a plurality of measurement points set at predetermined intervals in an axial direction of the glass fiber, when a first eccentric amount of the glass fiber from a central axis based on the outer periphery of the primary resin layer is measured, and a second eccentric amount of the glass fiber from a central axis based on the outer periphery of the secondary resin layer is measured, an average value of the first eccentric amount is smaller than an average value of the second eccentric amount.

5. The optical fiber according to claim 1, wherein a transmission loss difference determined by subtracting a transmission loss obtained at a time of winding the optical fiber into a coil having a diameter of 280 mm without winding the optical fiber around a bobbin, from a transmission loss obtained at a time of winding the optical fiber in one layer around a bobbin having a cylindrical diameter of 405 mm and having a metal mesh with a pitch of 150 μm wound thereon, is 1.5 dB/km or less.

6. The optical fiber according to claim 1,
wherein the cladding includes: an inner cladding surrounding an outer periphery of the core; a trench surrounding an outer periphery of the inner cladding; and an outer cladding surrounding an outer periphery of the trench,
the inner cladding has a refractive index lower than a refractive index of the core,
the trench has a refractive index lower than the refractive index of the inner cladding,
the outer cladding has a refractive index higher than the refractive index of the trench and lower than the refractive index of the core,
germanium is added to the core,
when a relative refractive index difference of the core with respect to the refractive index of the outer cladding is designated as $\Delta 1$, a relative refractive index difference of the inner cladding with respect to the refractive index of the outer cladding is designated as $\Delta 2$, a relative refractive index difference of the trench with respect to the refractive index of the outer cladding is designated as $\Delta 3$, a radius of the outer periphery of the core is designated as r1, a radius of the outer periphery of the inner cladding is designated as r2, and a radius of the outer periphery of the trench is designated as r3, r2/r1 is 2.2 or more and 3.6 or less, r3−r2 is 3 μm or more and 10 μm or less, $\Delta 1-\Delta 2$ is 0.15% or more and 0.40% or less, $|\Delta 2|$ is 0.10% or less, $\Delta 3$ is −0.70% or more and −0.20% or less,
the optical fiber has a mode field diameter of 8.8 μm or more and 9.6 μm or less for light having a wavelength of 1310 nm,
the optical fiber has a bending loss of 1.0 dB or less per one turn for light having a wavelength of 1625 nm when the optical fiber is wound into a torus shape having a diameter of 15 mm,
the optical fiber has a bending loss of 0.1 dB or less per 10 turns for light having a wavelength of 1625 nm when the optical fiber is wound into a torus shape having a diameter of 30 mm,
the optical fiber has a zero-dispersion wavelength of 1300 nm or more and 1324 nm or less,
the optical fiber has a cable cutoff wavelength of 1260 nm or less, and
the inner cladding has a mean chlorine mass concentration of 500 ppm or more and 5000 ppm or less.

7. The optical fiber according to claim 6, wherein the outer cladding has a mean OH mass concentration of 500 ppm or less.

8. The optical fiber according to claim 6, wherein when a standard deviation of a variation of the outer diameter in an axial direction of the glass fiber is designated as σ, 3σ is 0.1 μm or more and 0.5 μm or less.

9. An optical fiber comprising:
a glass fiber including a core and a cladding and having an outer diameter of 124.5 μm or more and 125.5 μm or less; and
a coating resin layer for surrounding an outer periphery of the glass fiber, the coating resin layer having a primary resin layer, a secondary resin layer, and a first colored layer,
wherein in the coating resin layer,
the primary resin layer surrounds the outer periphery of the glass fiber,
the secondary resin layer surrounds an outer periphery of the primary resin layer,
the first colored layer surrounds an outer periphery of the secondary resin layer,
the primary resin layer has a thickness of 7.5 μm or more and 17.5 μm or less,
the primary resin layer has a Young's modulus of 0.10 MPa or greater and 0.60 MPa or less at 23° C.,
the secondary resin layer has a thickness of 5.0 μm or more and 17.5 μm or less,
the secondary resin layer has an outer diameter of 165 μm or more and 175 μm or less, and
the secondary resin layer has a Young's modulus of 1200 MPa or greater and 2800 MPa or less at 23° C.,
wherein in a spectrum obtained by measuring, at a plurality of measurement points set at predetermined intervals in an axial direction of the glass fiber, an eccentric amount of the glass fiber from a central axis based on the outer periphery of the secondary resin layer, the eccentric amount being measured based on a position of an outer periphery of the coating resin layer and a position of the outer periphery of the glass fiber that are obtained from an image of light penetrated through the optical fiber, and Fourier transforming a waveform representing the eccentric amount at each position of the plurality of measurement points, a maximum value of an amplitude of the eccentric amount is 6 μm or less, and
wherein a wavelength at which the amplitude of the eccentric amount is largest is 0.1 m or more.

10. The optical fiber according to claim 9, wherein the primary resin layer has a Young's modulus of 0.10 MPa or greater and 0.40 MPa or less at 23° C.

11. The optical fiber according to claim 9, wherein the primary resin layer has a Young's modulus of 0.40 MPa or greater and 0.60 MPa or less at 23° C.

12. The optical fiber according to claim 9, wherein the coating resin layer further has a second colored layer, and the second colored layer is formed between the secondary resin layer and the first colored layer, has a color different from that of the first colored layer, and includes a plurality of ring patterns formed to be arranged mutually at an interval in an axial direction of the glass fiber.

13. The optical fiber according to claim 9, wherein at a plurality of measurement points set at predetermined intervals in an axial direction of the glass fiber, when a first eccentric amount of the glass fiber from a central axis based on the outer periphery of the primary resin layer is measured, and a second eccentric amount of the glass fiber from a central axis based on the outer periphery of the secondary resin layer is measured, an average value of the first eccentric amount is smaller than an average value of the second eccentric amount.

14. The optical fiber according to claim 9, wherein a transmission loss difference determined by subtracting a transmission loss obtained at a time of rounding the optical fiber into a ring having a diameter of 280 mm without winding the optical fiber around a bobbin, from a transmission loss obtained at the time of winding the optical fiber in one layer around a bobbin having a cylindrical diameter of 405 mm and having a metal mesh with a pitch of 150 μm wound thereon, is 1.5 dB/km or less.

15. The optical fiber according to claim 9,
wherein the cladding includes: an inner cladding surrounding an outer periphery of the core; a trench surrounding an outer periphery of the inner cladding; and an outer cladding surrounding an outer periphery of the trench,
the inner cladding has a refractive index lower than a refractive index of the core,
the trench has a refractive index lower than the refractive index of the inner cladding,
the outer cladding has a refractive index higher than the refractive index of the trench and lower than the refractive index of the core,
germanium is added to the core,
when a relative refractive index difference of the core with respect to the refractive index of the outer cladding is designated as $\Delta 1$, a relative refractive index difference of the inner cladding with respect to the refractive index of the outer cladding is designated as $\Delta 2$, a relative refractive index difference of the trench with respect to the refractive index of the outer cladding is designated as $\Delta 3$, a radius of the outer periphery of the core is designated as r1, a radius of the outer periphery of the inner cladding is designated as r2, and a radius of the outer periphery of the trench is designated as r3, r2/r1 is 2.2 or more and 3.6 or less, r3−r2 is 3 μm or more and 10 μm or less, $\Delta 1-\Delta 2$ is 0.15% or more and 0.40% or less, $|\Delta 2|$ is 0.10% or less, $\Delta 3$ is −0.70% or more and −0.20% or less,
the optical fiber has a mode field diameter of 8.8 μm or more and 9.6 μm or less for light having a wavelength of 1310 nm,
the optical fiber has a bending loss of 1.0 dB or less per one turn for light having a wavelength of 1625 nm when the optical fiber is wound into a coil having a diameter of 15 mm,
the optical fiber has a bending loss of 0.1 dB or less per 10 turns for light having a wavelength of 1625 nm when the optical fiber is wound into a torus shape having a diameter of 30 mm,
the optical fiber has a zero-dispersion wavelength of 1300 nm or more and 1324 nm or less,
the optical fiber has a cable cutoff wavelength of 1260 nm or less, and
the inner cladding has a mean chlorine mass concentration of 500 ppm or more and 5000 ppm or less.

16. The optical fiber according to claim 15, wherein the outer cladding has a mean OH mass concentration of 500 ppm or less.

17. The optical fiber according to claim 15, wherein when a standard deviation of a variation of the outer diameter in an axial direction of the glass fiber is designated as σ, 3σ is 0.1 μm or more and 0.5 μm or less.

* * * * *